(12) United States Patent
Chang et al.

(10) Patent No.: US 11,704,819 B2
(45) Date of Patent: Jul. 18, 2023

(54) APPARATUS AND METHOD FOR ALIGNING 3-DIMENSIONAL DATA

(71) Applicants: MEDIT CORP., Seoul (KR); Korea University Research and Business Foundation, Seoul (KR)

(72) Inventors: Min Ho Chang, Seoul (KR); Han Sol Kim, Seoul (KR); Keonhwa Jung, Seoul (KR)

(73) Assignees: MEDIT CORP., Seoul (KR); Korea University Research and Business Foundation, Seoul (KR)

( * ) Notice: Subject to any disclaimer, the term of this patent is extended or adjusted under 35 U.S.C. 154(b) by 35 days.

(21) Appl. No.: 17/033,674

(22) Filed: Sep. 25, 2020

(65) Prior Publication Data

US 2021/0097703 A1    Apr. 1, 2021

(30) Foreign Application Priority Data

Sep. 26, 2019 (KR) .......................... 10-2019-0119053

(51) Int. Cl.
*G06T 7/33* (2017.01)
*G06T 7/73* (2017.01)
*G06T 7/11* (2017.01)

(52) U.S. Cl.
CPC .................. *G06T 7/33* (2017.01); *G06T 7/11* (2017.01); *G06T 7/73* (2017.01); *G06T 2200/04* (2013.01);
(Continued)

(58) Field of Classification Search
CPC ..... G06T 7/33; G06T 7/11; G06T 7/73; G06T 2200/04; G06T 2207/10081;
(Continued)

(56) References Cited

U.S. PATENT DOCUMENTS

2006/0235294 A1   10/2006   Florin et al.
2012/0230566 A1*   9/2012   Dean ................... A61F 2/30942
                                                                382/128
(Continued)

FOREIGN PATENT DOCUMENTS

CN         107146232 A       9/2017
JP         2010-515502 A     5/2010
KR      10-2019-0101694 A    9/2019

OTHER PUBLICATIONS

Notice of Allowance dated Jul. 6, 2021 for Korean Application No. 10-2019-0119053.

*Primary Examiner* — John Villecco
*Assistant Examiner* — Han Hoang
(74) *Attorney, Agent, or Firm* — Insight Law Group, PLLC; Seung Lee

(57) ABSTRACT

The present disclosure discloses a three-dimensional data alignment apparatus, a three-dimensional data alignment method, and a recording medium, which may align a location between volumetric data and surface data even without a segmentation process of extracting a surface from the volumetric data. A three-dimensional data alignment apparatus according to an exemplary embodiment of the present disclosure includes a three-dimensional data alignment unit for aligning a location between first three-dimensional data and second three-dimensional data expressed in different data forms with regard to a target to be measured. The first three-dimensional data are three-dimensional data acquired in a voxel form with regard to the target to be measured, and the second three-dimensional data are three-dimensional data acquired in a surface form with regard to the target to be measured. The three-dimensional data alignment unit is configured to extract one or more vertices from the second three-dimensional data; extract the first voxel values of first voxels located around each vertex from the first three-
(Continued)

dimensional data, based on a location of each vertex extracted from the second three-dimensional data; determine corresponding points between the first three-dimensional data and the second three-dimensional data based on the first voxel values extracted from the first three-dimensional data; and calculate location conversion information minimizing a location error between the first three-dimensional data and the second three-dimensional data based on the corresponding points.

20 Claims, 23 Drawing Sheets

(52) U.S. Cl.
CPC ............... *G06T 2207/10081* (2013.01); *G06T 2207/10088* (2013.01); *G06T 2207/30036* (2013.01)

(58) Field of Classification Search
CPC . G06T 2207/10088; G06T 2207/30036; G06T 2207/20161; G06T 7/187; G06T 7/0012; A61B 6/5247; A61B 5/0035; A61B 5/7203; A61B 6/14; A61B 6/5217; A61B 6/5258; A61C 9/0046; G16H 30/40
See application file for complete search history.

(56) References Cited

U.S. PATENT DOCUMENTS

| | | | |
|---|---|---|---|
| 2013/0287166 A1* | 10/2013 | Arai | A61B 6/5258 378/20 |
| 2016/0042509 A1* | 2/2016 | Andreiko | G16Z 99/00 382/128 |
| 2019/0350680 A1* | 11/2019 | Chekh | G06T 19/006 |

* cited by examiner

FIG. 2
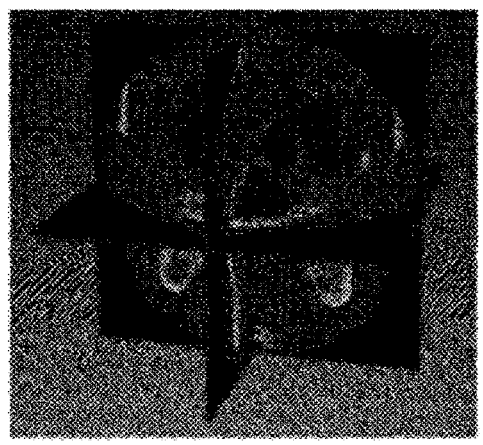
(a)
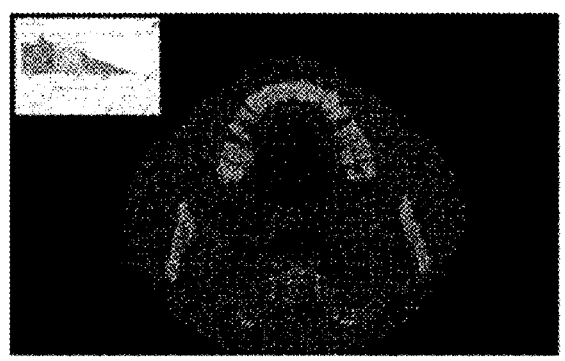
(b)
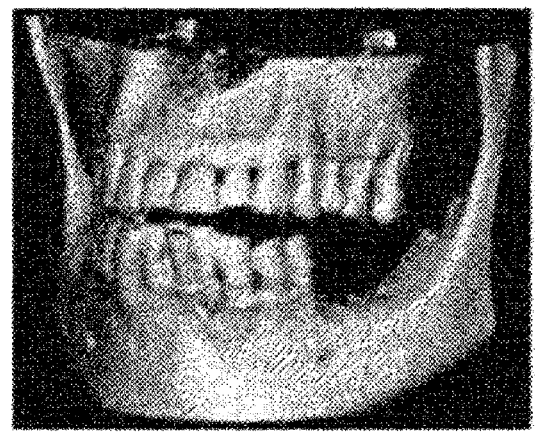
(c)

FIG. 3
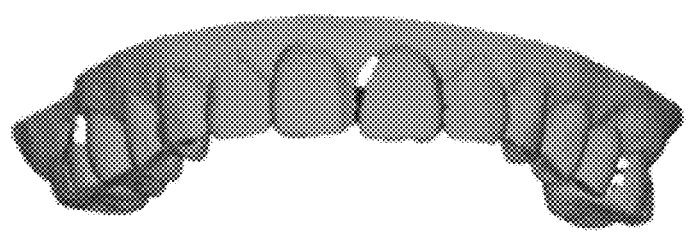
(a)
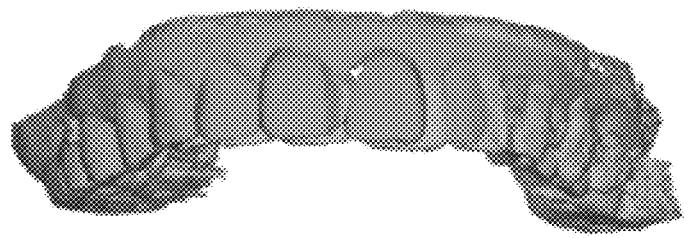
(b)
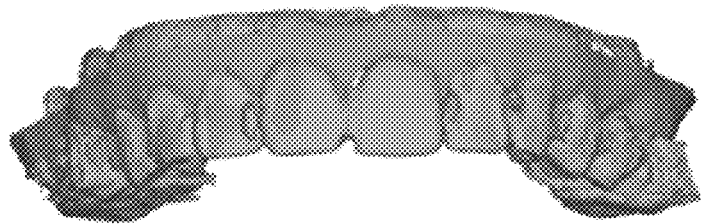
(c)

FIG. 4
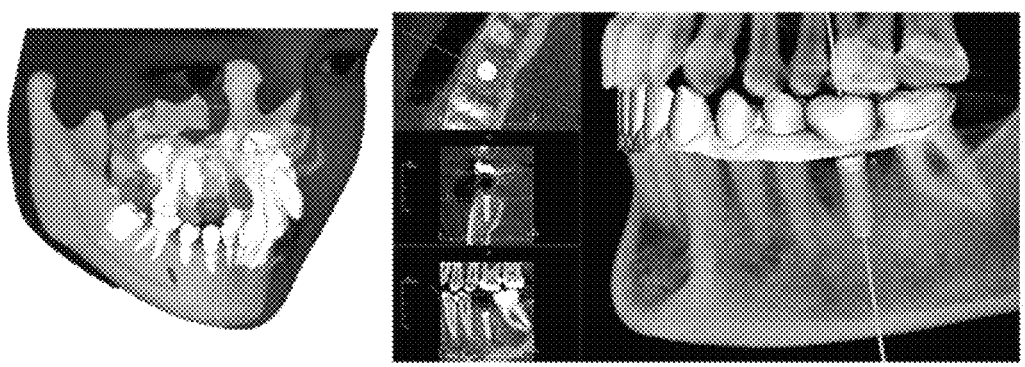
(a)  (b)
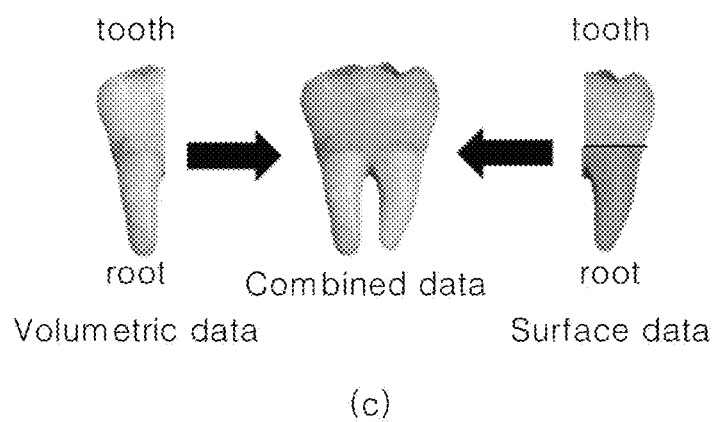
(c)

(a)   (b)

FIG. 23
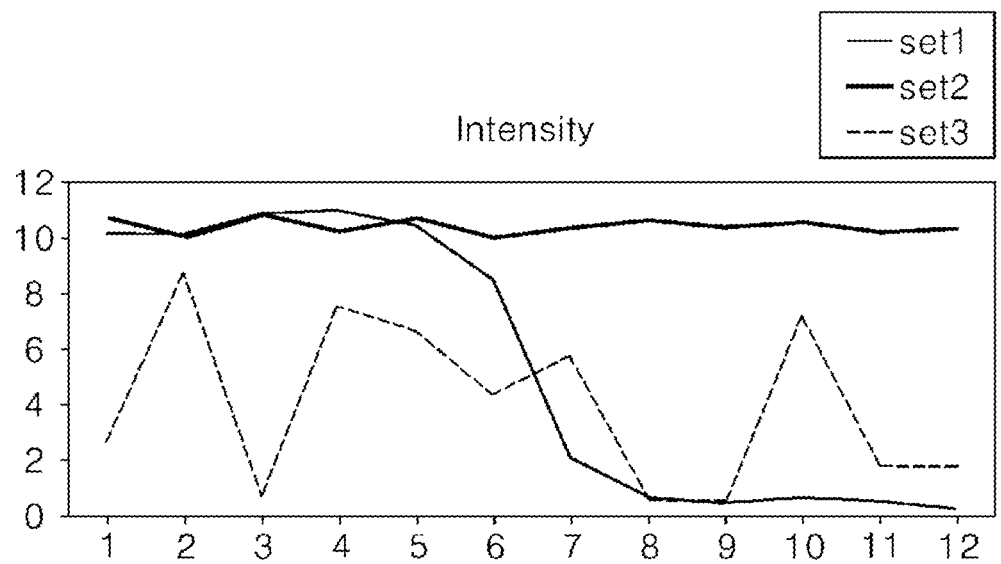
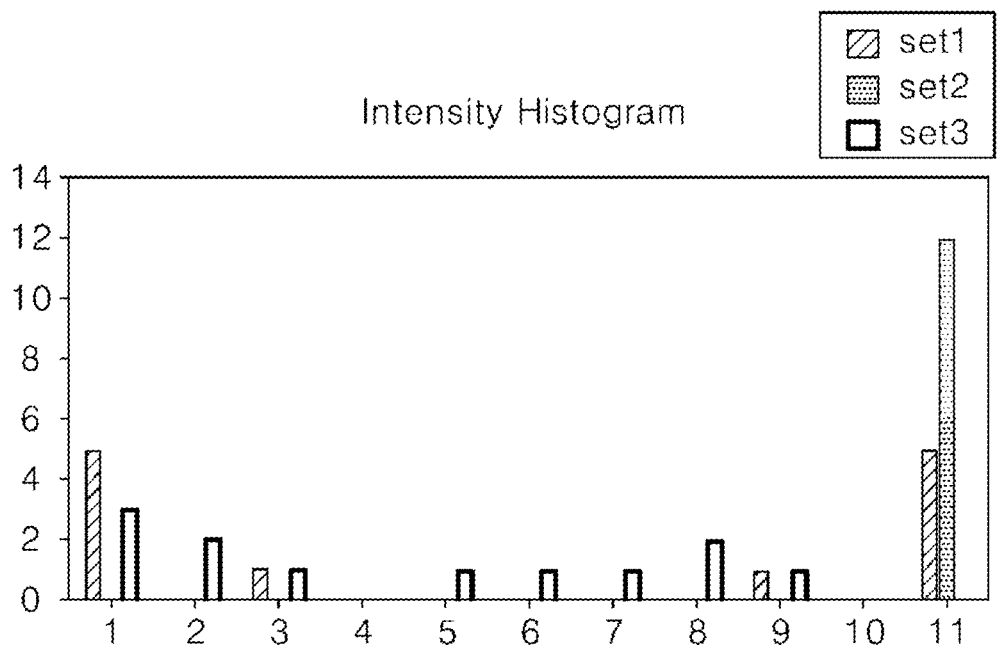

APPARATUS AND METHOD FOR ALIGNING 3-DIMENSIONAL DATA

CROSS-REFERENCE TO RELATED APPLICATION

This application claims priority to Korean Patent Application No. 10-2019-0119053, filed on Sep. 26, 2019, which is incorporated herein by reference in their entirety.

BACKGROUND OF THE DISCLOSURE

Field of the Disclosure

The present disclosure relates to a three-dimensional data alignment apparatus and a three-dimensional data alignment method, which align a location between two types or more of a plurality of three-dimensional data expressed in a method for expressing different data, and more specifically, to a three-dimensional data alignment apparatus and a three-dimensional data alignment method, which align a location between three-dimensional volumetric data acquired by a CT/MRI or the like and expressed in a voxel form and three-dimensional surface data acquired by a three-dimensional optical scanner or the like and expressed in a surface form.

Description of Related Art

Dental computer aided design/computer aided manufacturing (CAD/CAM) technologies are widely used for dental treatment, particularly, prosthetic treatment or the like. It is most important to acquire elaborate 3D data with respect to a shape of the affected part of a patient, such as tooth, gum, or jawbone, in the dental treatment using the CAD/CAM. It is possible to accurately calculate and perform prosthetic treatment, orthodontic treatment, or the like using a computer when three-dimensional data of the affected part is used. At this time, to obtain good treatment results, it is necessary to secure three-dimensional data accurately reflecting the shape of the affected part of the patient.

A computed tomography (CT), a magnetic resonance imaging (MRI), a dental three-dimensional scanner or the like may be used to obtain the three-dimensional data of the affected part in the dental CAD/CAM treatment process. At this time, there is a difference in the form and characteristics of the data which may be acquired by an apparatus and a method used for measurement, and generally, the three-dimensional data may be classified into volumetric data and surface data according to the expression format thereof.

The volumetric data may be acquired by an X-ray computed tomography (CT) such as a cone beam computed tomography (CBCT), a magnetic resonance imaging (MRI), or the like, and expressed in a form of having an intensity value within a voxel structure. A three-dimensional optical scanner in addition to the CT is widely used in the dental CAD/CAM fields. The three-dimensional optical scanner may acquire three-dimensional surface shape information of a target to be measured, and for example, acquire three-dimensional data of an impression body of a tooth, a plaster model acquired by the impression body, or a tooth surface.

The volumetric data and the surface data have a meaningful difference in the accuracy of the acquired three-dimensional data in addition to a data expression format. The three-dimensional surface data acquired by the three-dimensional optical scanner for the dental CAD/CAM are known as having a relatively high accuracy (e.g., about 20 um or less), and represent a relatively high accuracy of about 60 um even if all of post processings are included. In comparison, the three-dimensional volumetric data acquired by the CBCT has a relatively low accuracy (e.g., about 200 um).

To summarize a difference between the volumetric data and the surface data, the volumetric data are acquired by the CT/MRI or the like and thus the in-body (skeleton or the like) may be measured, but the surface data are acquired by the three-dimensional scanner or the like and thus only the outside of the body (surface shape) may be measured. Further, the volumetric data have a precision lower than that of the surface data and it takes a long time to measure the volumetric data, but the surface data may have a high precision and be measured in real time.

The three-dimensional volumetric data and surface data are used for various purposes in the applications using the dental CAD/CAM. There is also a case of using only the volumetric data or only the surface data according to the application, but there is also a case where all of two types of data are required to be used for the orthodontic treatment, a surgery plan (implant), the treatment of tooth and jawbone-related diseases, or the like. In this case, there is a need for a process of aligning a location between a plurality of three-dimensional data acquired by different equipment.

The CT data has an advantage of expressing not only a shape of the surface exposed to the outside such as tooth or gum, but also a shape inside the affected part of the patient not exposed to the outside such as the root of a tooth or a jawbone. However, it is widely known that the accuracy of 0.05 mm or less is required to make a prosthesis suitable for the affected part of the patient in the dental treatment, and the accuracy of the CT data has about 0.2 mm, and does not satisfy the requirement, such that there is a restriction in the use of the dental treatment.

Meanwhile, upon the implant surgery plan, an insertion direction of the implant is required to be determined in consideration of information such as a shape of a tooth, a jawbone, the root of the tooth, and a nerve around a lost affected part, and at this time, the three-dimensional surface data are needed for designing a prosthesis, and the volumetric data are needed for placing the implant. Further, to predict a state check before the treatment of the tooth and facial shape and an expected change after the treatment thereof upon the treatment of the tooth and jawbone-related diseases and the orthodontic treatment, the three-dimensional integrated data for the entire site of the maxillary and mandible of the patient, such as the patient's face, as well as the tooth and the jawbone are needed.

Since the three-dimensional data acquired by different apparatuses have different spatial location references and also have different locations of the data, the location alignment is needed to use two types of data together. For the location alignment between different types of data, a location conversion between the data is needed. The accuracy required for the location alignment between the volumetric data and the surface data is known as having about 1.0 mm to 2.0 mm. For example, the accuracy of 2.0 mm or less is needed to predict a change in the facial shape upon orthodontic treatment, and the accuracy of 1.0 mm or less is needed for the implant placement surgery plan.

FIG. 1 is a flowchart illustrating a conventional method for aligning between volumetric data and surface data. Conventionally, for the location alignment between the volumetric data and the surface data, a segmentation method for acquiring the surface data of tooth or the like from the volumetric data is used (S1). When the surface data is generated from the volumetric data through segmentation, an initial condition is set with respect to the surface data acquired by a three-dimensional optical scanner and the surface data generated from the volumetric data (S2), and then the location alignment between two surface data is performed using an iterative closest point (ICP) algorithm (S3).

FIG. 2 is an exemplary diagram illustrating the surface data extracted through segmentation for the volumetric data according to a conventional method. FIG. 2A is an exemplary diagram illustrating the volumetric data acquired by a CT, FIG. 2B is an exemplary diagram illustrating segmentation for the volumetric data, and FIG. 2C is an exemplary diagram illustrating the surface data generated by the segmentation for the volumetric data. FIG. is an exemplary diagram illustrating the location alignment between the surface data generated by a three-dimensional optical scanner according to the conventional method, and the surface data generated through segmentation. FIG. 3A is an exemplary diagram illustrating the surface data generated by the three-dimensional optical scanner, FIG. 3B is an exemplary diagram illustrating a state of setting initial locations of the surface data generated by the three-dimensional optical scanner and the surface data extracted from the volumetric data by the segmentation, and FIG. 3C is an exemplary diagram illustrating a state in which the locations between the surface data generated by the three-dimensional optical scanner and the surface data extracted from the volumetric data by the segmentation are aligned in an iterative closest point (ICP) method.

A method for aligning the location using the ICP method after generating the surface data by the segmentation of the volumetric data is used in the dental CAD/CAM application, but the following problems exist. First, a process of extracting the surface data from the volumetric data by the segmentation in the process of aligning the locations between the volumetric data and the surface data is the most time-consuming process. Second, the user such as a medical professional is required to directly input a specific value for setting an initial condition for the volumetric data and/or the surface data in the location alignment process using the segmentation and the ICP algorithm (S2), and the accuracy of the location alignment may be dependent on the user's input.

Since the volumetric data acquired by the CT has the intensity values which may be variously represented according to the physical property of a tissue, a segmentation method of the CT data in which a person's head has been measured is mainly performed in a method for splitting intensity information of the volumetric data according to a specific threshold. At this time, the surface data generated by the segmentation of the volumetric data are varied according to which value the threshold is set to. For example, the surface data extracted from the CT data in which the person's head has been measured may also indicate a surface of the skull and may also indicate a surface of the skin according to the threshold set by the user.

A software UI may provide a function capable of adjusting the threshold, and the user may confirm the surface data generated according to the threshold while adjusting the threshold, and at this time, the surface data having different forms are generated according to the input threshold and the user such as a medical professional sets the threshold regarded as being suitable while visually confirming the surface data according to a situation to finally generate the surface data.

Active contour methods such as a region growing or a level-set may also be used for the segmentation in addition to the aforementioned method using the threshold. The region growing method is a method for setting several seed points and then connecting points having similar inner values owned by the volumetric data such as the intensity value or other calculated values from the seed points to expand a region in which the seed is included. The level-set method is a method for performing the segmentation in the method for cutting data in the two-dimensional axial direction and performing the segmentation and then accumulating the segmented data in the three dimensions.

However, all of the conventional segmentation methods require the subjective input of the user. The method using the threshold is required to determine the threshold, and the region growing method is required to determine the seed point. The level-set method is required to set an initial contour. As described above, the process of receiving the subjective input of the user is the most time-consuming process in the location alignment process between the volumetric data and the surface data. Further, post processing processes such as noise removal and smoothing are needed to use the surface data generated through the segmentation for the location alignment. Further, since the surface data are differently generated according to the user performing the segmentation, the result of the location alignment is also different due to the differently generated surface data.

Third, another difficulty in the location alignment process between the surface data is a distortion problem due to artifact of a metallic material implanted in the patient. If the prosthesis made of a metallic material such as gold or amalgam exists in the patient's tooth, the CT data of the patient have the intensity value which is in a saturated state in a portion in which the metallic prosthesis exists and thus the volumetric data neighboring thereto are contaminated. Therefore, there occurs a problem in that the surface data extracted from the volumetric data are also distorted, and the result of the location alignment using the distorted surface data is also inevitably distorted.

SUMMARY OF THE DISCLOSURE

An object of the present disclosure is to provide a three-dimensional data alignment apparatus, a three-dimensional data alignment method, and a recording medium, which may align the location between volumetric data and surface data even without a segmentation process of extracting a surface from the volumetric data.

Further, another object of the present disclosure is to provide a three-dimensional data alignment apparatus, a three-dimensional data alignment method, and a recording medium, which may prevent a distortion phenomenon due to artifact of a metallic material or like implanted in a patient.

A three-dimensional data alignment apparatus according to one aspect of the present disclosure includes a three-dimensional data alignment unit for aligning a location between first three-dimensional data and second three-dimensional data expressed in different data forms with regard to a target to be measured. The first three-dimensional data are three-dimensional data acquired in a voxel form with regard to the target to be measured, and the second three-dimensional data are three-dimensional data acquired in a surface form with regard to the target to be measured. The three-dimensional data alignment unit may be configured to extract one or more vertices from the second three-dimensional data, extract the first voxel values of first voxels located around each vertex from the first three-dimensional data, based on a location of each vertex extracted from the second three-dimensional data, determine corresponding points between the first three-dimensional data and the second three-dimensional data based on the first voxel values extracted from the first three-dimensional data, and calculate location conversion information minimizing a location error between the first three-dimensional data and the second three-dimensional data based on the corresponding points.

The three-dimensional data alignment unit may be configured to determine sampling locations at a predetermined interval in a normal direction perpendicular to a surface of each vertex extracted from the second three-dimensional data, calculate intensity values at the sampling locations based on the first voxel values, and determine the location conversion information based on the amount of change in the intensity values between the sampling locations.

The three-dimensional data alignment unit may be configured to calculate the intensity values with respect to the sampling locations by interpolating the first voxel values in the three dimensions, based on the location relationship between the first voxels and the sampling locations, extract an inflection point from the first three-dimensional data based on the amount of change in the normal direction of the intensity values, and determine the inflection point and each vertex as corresponding points, and calculate a distance error between each vertex and the inflection point, and determine the movement direction in which the distance error is minimized for location alignment between the first three-dimensional data and the second three-dimensional data.

The three-dimensional data alignment unit may be configured to calculate change directions of the first voxel values by differentiating the first voxel values at the location of each vertex, determine sampling locations around each vertex extracted from the second three-dimensional data, calculate the intensity values at the sampling locations based on the change directions of the first voxel values, and determine the movement direction in which the distance error between the first three-dimensional data and the second three-dimensional data is minimized based on the amount of change in the intensity values.

The three-dimensional data alignment unit may be configured to extract the first voxels by excluding voxels having a voxel value exceeding a reference intensity set with regard to artifact of a metallic material among the voxels located around each vertex from the first three-dimensional data.

The three-dimensional data alignment apparatus according to the exemplary embodiment of the present disclosure may further include: a segmentation unit for extracting a first surface from the first three-dimensional data, based on the location conversion information between the first three-dimensional data and the second three-dimensional data.

The segmentation unit may be configured to convert a location of a second surface extracted from the second three-dimensional data according to the location conversion information, and extract the first surface by extracting the intensity values of the first three-dimensional data corresponding to the second surface converted according to the location conversion information.

In another exemplary embodiment of the present disclosure, the three-dimensional data alignment unit may be configured to calculate an intensity value distribution of voxels around the vertex from the first three-dimensional data, determine the first voxels based on a deviation of the intensity values from the intensity value distribution of the voxels around the vertex, and determine the corresponding points based on the locations of the first voxels.

The first three-dimensional data may include: volumetric data acquired for the target to be measured by a computed tomography (CT) or a magnetic resonance imaging (MRI). The volumetric data may include: intensity information of the voxels split at a regular interval. The second three-dimensional data may include: surface data acquired for the target to be measured by a three-dimensional optical scanner. The surface data may include: location information of vertices and normal vector information of the vertices.

The first three-dimensional data may include: volumetric data acquired for a tooth and the root of the tooth. The second three-dimensional data may include: surface data acquired for at least one surface among the tooth, an impression body of the tooth, and a plaster model acquired by the impression body.

A three-dimensional data alignment method according to another aspect of the present disclosure includes: aligning, by a three-dimensional data alignment unit, a location between first three-dimensional data and second three-dimensional data expressed in different data form with regard to a target to be measured. The first three-dimensional data are three-dimensional data acquired in a voxel form with regard to the target to be measured, and the second three-dimensional data are three-dimensional data acquired in a surface form with regard to the target to be measured. The aligning of the location includes: extracting one or more vertices from the second three-dimensional data; extracting the first voxel values of first voxels located around each vertex from the first three-dimensional data, based on a location of each vertex extracted from the second three-dimensional data; determining corresponding points between the first three-dimensional data and the second three-dimensional data based on the first voxel values extracted from the first three-dimensional data; and calculating location conversion information minimizing a location error between the first three-dimensional data and the second three-dimensional data based on the corresponding points.

The aligning of the location may include: determining sampling locations at a predetermined interval in a normal direction of each vertex extracted from the second three-dimensional data; determining the location conversion information based on at least one of the amount of change in and the direction of change in the first voxel values between the sampling locations.

The determining of the location conversion information may include: calculating intensity values with respect to the sampling locations by interpolating the first voxel values in the three dimensions, based on the location relationship between the first voxels and the sampling locations; extracting an inflection point from the first three-dimensional data based on the amount of change in the normal direction of the intensity values, and determining the inflection point and each vertex as the corresponding points; and calculating a distance error between each vertex and the inflection point, and determining the movement direction in which the distance error is minimized for the location alignment between the first three-dimensional data and the second three-dimensional data.

The determining of the location conversion information may include: calculating change directions of the first voxel values by differentiating the first voxel values at a location of each vertex; determining sampling locations around each vertex extracted from the second three-dimensional data; calculating the intensity values at the sampling locations based on the change directions of the first voxel values; and determining the movement direction in which the distance error between the first three-dimensional data and the second three-dimensional data is minimized based on the amount of change in the intensity values.

The aligning of the location may extract the first voxels by excluding voxels having a voxel value exceeding a reference intensity set with regard to artifact of a metallic material among the voxels located around each vertex from the first three-dimensional data.

The three-dimensional data alignment method according to an exemplary embodiment of the present disclosure may further include: extracting, by a segmentation unit, a first surface from the first three-dimensional data, based on the location conversion information between the first three-dimensional data and the second three-dimensional data.

The extracting of the first surface may include: converting a location of a second surface extracted from the second three-dimensional data according to the location conversion information, and extracting the first surface by extracting the intensity values of the first three-dimensional data corresponding to the second surface converted according to the location conversion information.

In another exemplary embodiment of the present disclosure, the aligning of the location may include: calculating an intensity value distribution of voxels around the vertex from the first three-dimensional data; determining the first voxels based on a deviation of the intensity values in the intensity value distribution of the voxels around the vertex; and determining the corresponding points based on the locations of the first voxels.

Still another aspect of the present disclosure provides a computer readable recording medium in which a program for executing the three-dimensional data alignment method is recorded.

The exemplary embodiment of the present disclosure may provide the three-dimensional data alignment apparatus, the three-dimensional data alignment method, and the recording medium, which may align the location between the volumetric data and the surface data, even without the segmentation process of extracting the surface from the volumetric data.

Further, the exemplary embodiment of the present disclosure may provide the three-dimensional data alignment apparatus, the three-dimensional data alignment method, and the recording medium, which may prevent the distortion phenomenon due to the artifact of the metallic material or like implanted in the patient.

BRIEF DESCRIPTION OF THE DRAWINGS

FIG. 2 is an exemplary diagram illustrating the surface data extracted through segmentation for the volumetric data according to the conventional method.

FIG. 3 is an exemplary diagram illustrating the result of aligning the location between the surface data generated by a three-dimensional optical scanner, and the surface data generated through the segmentation according to the conventional method.

FIG. 4 is an exemplary diagram illustrating the generation of three-dimensional integrated data by aligning the locations of three-dimensional volumetric data and three-dimensional surface data according to an exemplary embodiment of the present disclosure.

FIG. 23 is an exemplary embodiment for explaining the three-dimensional data alignment method according to the exemplary embodiment illustrated in FIG. 22.

DESCRIPTION OF SPECIFIC EMBODIMENTS

Figure 1:
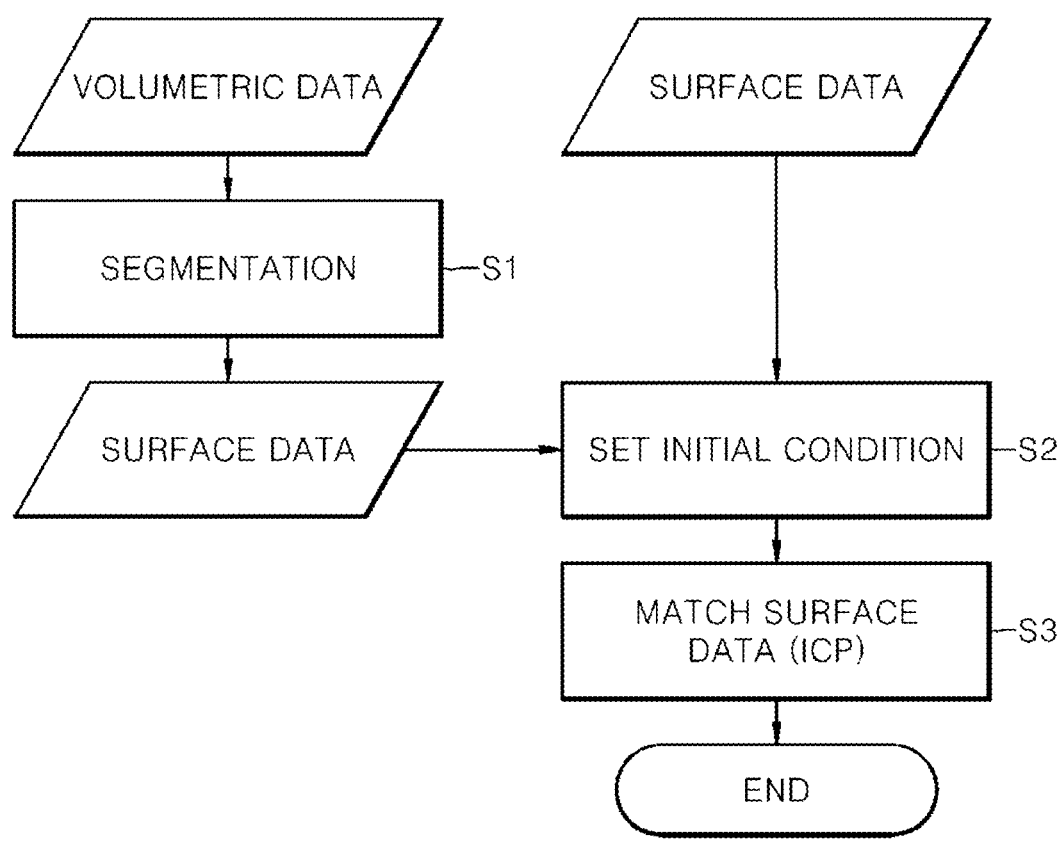
FIG. 1 is a flowchart illustrating a conventional alignment method between volumetric data and surface data.

The advantages and features of the present disclosure and the method for achieving them will become apparent with reference to the exemplary embodiments described later in detail in conjunction with the accompanying drawings. However, the present disclosure is not limited to the exemplary embodiments disclosed below but may be implemented in various different forms, and the present exemplary embodiments are only provided to complete the disclosure of the present disclosure and to completely inform those skilled in the art to which the present disclosure pertains of the scope of the disclosure, the present disclosure is defined by only the scope of the claims. Throughout the specification, the same reference numerals denote the same components.

In the present specification, when a certain part is said to "include" a certain component, it means that other components may be further included rather than excluding other components unless specifically stated to the contrary. A '~unit' used in the present specification is a unit of processing at least one function or operation, and for example, may mean software, FPGA, or hardware component. The function provided by the '~unit' may be separated and performed by a plurality of components, or may also be integrated with other additional components. The '~unit' in the present specification is not necessarily limited to software or hardware, and may also be configured to be present in an addressable storage medium, and may also be configured to reproduce one or more processors. Hereinafter, exemplary embodiments of the present disclosure will be described in detail with reference to the drawings.

A three-dimensional data alignment apparatus and a three-dimensional data alignment method according to an exemplary embodiment of the present disclosure may be provided to align a location between two types or more of three-dimensional data having different data expression methods, like three-dimensional surface data and three-dimensional volumetric data. The three-dimensional data alignment method according to the exemplary embodiment of the present disclosure may perform the location alignment between volumetric data and surface data without a segmentation process of extracting a surface from the volumetric data.

FIG. 4 is an exemplary diagram illustrating the generation of three-dimensional integrated data by aligning the locations of three-dimensional volumetric data and three-dimensional surface data according to the exemplary embodiment of the present disclosure. As illustrated in FIG. 4, the three-dimensional data alignment method according to the exemplary embodiment of the present disclosure may be applied to a case where all of different three-dimensional data having different forms are required to be used. For example, when all of the surface data acquired by a three-dimensional optical scanner and the volumetric data acquired by a CT are utilized, it is possible to check a state before the treatment of the tooth and the facial shape, predict an expected change after the treatment, and the like upon orthodontic treatment by utilizing the high accuracy of the surface data acquired by the three-dimensional scanner, and the advantage of the volumetric data capable of confirming a state inside an affected part which is difficult to check visually.

The surface data and the volumetric data may be utilized to determine an insertion direction of an implant in consideration of information about the shape of a tooth, a jawbone, the root of the tooth, a nerve, and the like around a lost affected part in an implant surgery plan, the three-dimensional surface data may be utilized to design a prosthesis, and the volumetric data may be utilized to place the implant. Further, three-dimensional integrated data for the entire site of the maxilla and mandible of a patient, such as the patient's face, as well as a tooth and a jawbone may be utilized for the treatment of the tooth and jawbone-related diseases. Since the three-dimensional data acquired by different apparatuses have different spatial location references and also have different locations of the data, the location alignment is needed to use two types of data together. Information for the location conversion between the data is needed to align the location between different types of data.

Figure 5:
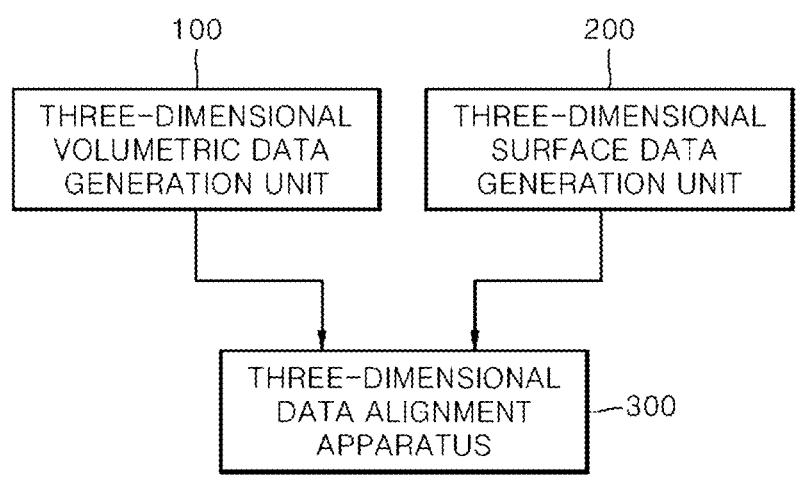
FIG. 5 is a diagram illustrating a configuration of a three-dimensional data generation apparatus including a three-dimensional data alignment apparatus according to the exemplary embodiment of the present disclosure.

FIG. 5 is a diagram illustrating a configuration of a three-dimensional data generation apparatus including the three-dimensional data alignment apparatus according to the exemplary embodiment of the present disclosure. Referring to FIG. 5, the three-dimensional data generation apparatus may include a three-dimensional volumetric data generation unit 100, a three-dimensional surface data generation unit 200, and a three-dimensional data alignment apparatus 300.

Figure 6:
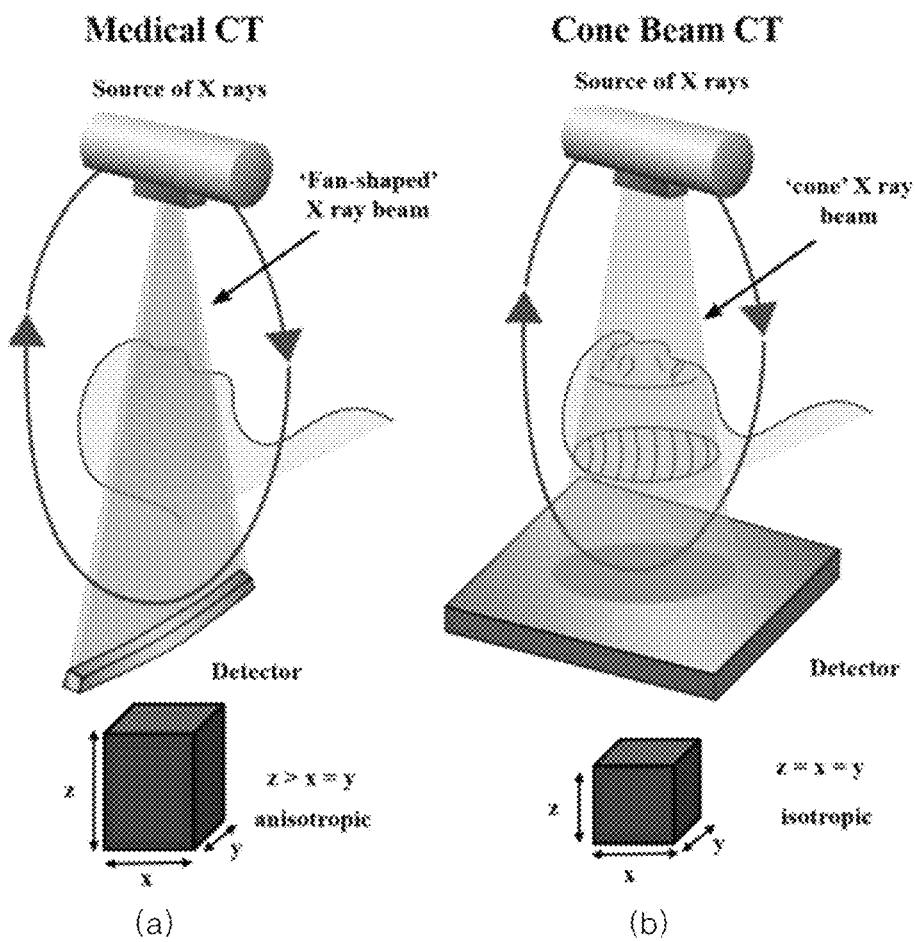
FIG. 6 is an exemplary diagram illustrating a three-dimensional volumetric data generation unit.
Figure 7:
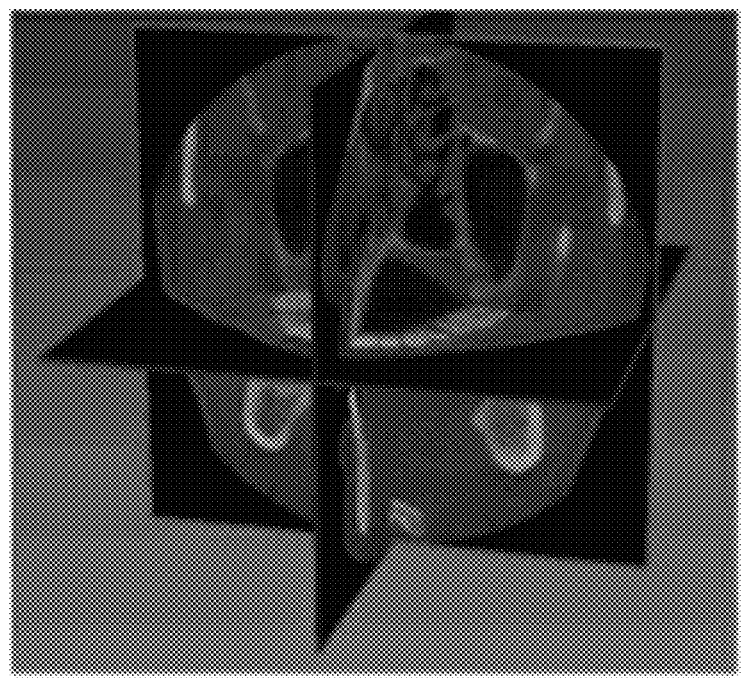
FIG. 7 is an exemplary diagram illustrating the three-dimensional volumetric data generated by the three-dimensional volumetric data generation unit.

FIG. 6 is an exemplary diagram of the three-dimensional volumetric data generation unit, and FIG. 7 is an exemplary diagram illustrating the three-dimensional volumetric data generated by the three-dimensional volumetric data generation unit. Referring to FIGS. 6 and 7, the three-dimensional volumetric data generation unit 100 may generate three-dimensional volumetric data with respect to a target to be measured. The three-dimensional volumetric data generation unit 100 may be provided as the three-dimensional data generation apparatus such as a computed tomography (CT), a magnetic resonance imaging (MRI), or the like. The volumetric data (or voxel data) may include intensity information of voxels split by a regular interval. The intensity information of the voxels may be recorded according to a transmittance of an X-ray for each region of the target to be measured. The volumetric data may be expressed in a form of having an intensity value within a voxel structure.

The volumetric data in the dental CAD/CAM field may be stored/expressed using a digital imaging and communications in medicine (DICOM) file format. The DICOM format may record 90 or more kinds of information such as patient information, a generator, or the like in addition to the intensity. In the exemplary embodiment, the volumetric data may be acquired by an X-ray computed tomography (CT). The volumetric data may be divided into three axial directions (sagittal, axial, and coronal).

FIG. 6A is an exemplary diagram illustrating a CT apparatus using an X-ray beam having a fan shape used in a general medical CT apparatus, and FIG. 6B is an exemplary diagram illustrating a cone beam computed tomography (CBCT) apparatus. The CT apparatus using the fan-shaped X-ray may obtain high resolution data compared to the CBCT apparatus. As illustrated in FIG. 6A, the X-ray beam having the fan shape capable of obtaining high resolution data may be used in the general medical CT apparatus, but the CBCT using the X-ray beam having a cone shape with radiation exposure smaller than that of the general CT apparatus may be used in the dental CAD/CAM field. A resolution difference according to directions of the volumetric data acquired depending on the transmitted shape of the X-ray appears, and the CT using the X-ray having the fan shape acquires anisotropic volumetric data, and the CBCT acquires isotropic volumetric data. The isotropic volumetric data are computationally more advantageous upon three-dimensional data processing.

Figure 8:
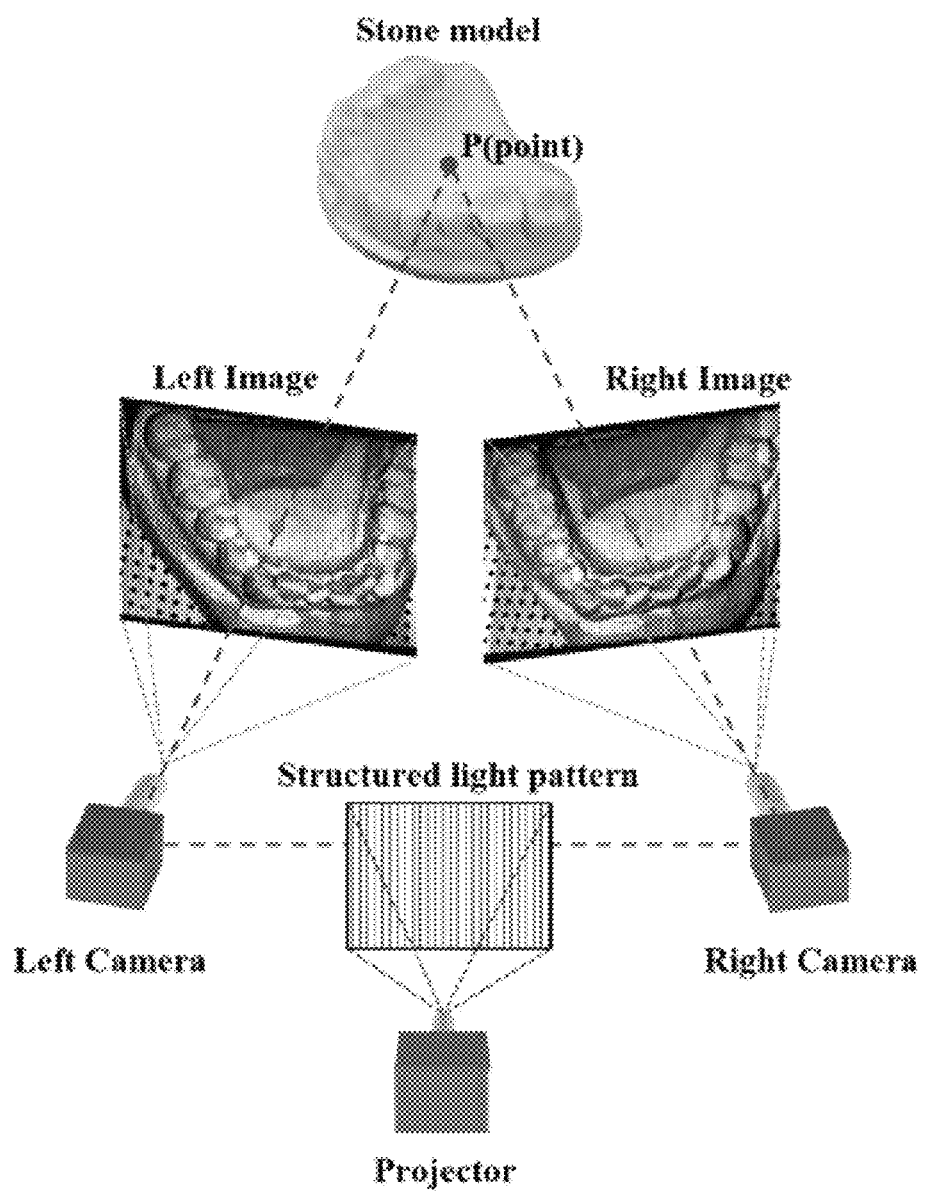
FIG. 8 is an exemplary diagram illustrating a three-dimensional surface data generation unit.
Figure 9:
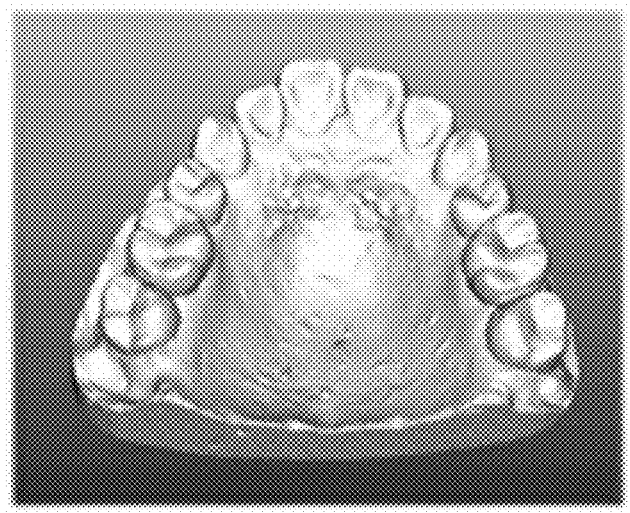
FIG. 9 is an exemplary diagram illustrating the three-dimensional surface data generated by the three-dimensional surface data generation unit.

FIG. 8 is an exemplary diagram illustrating a three-dimensional surface data generation unit, and FIG. 9 is an exemplary diagram illustrating the three-dimensional surface data generated by the three-dimensional surface data generation unit. Referring to FIGS. 5, 8, and 9, the three-dimensional surface data generation unit 200 may be provided as a three-dimensional optical scanner for generating the three-dimensional surface data with respect to the target to be measured or the like. The three-dimensional optical scanner may acquire three-dimensional shape information of the surface of the target to be measured, and acquire three-dimensional data of an impression body of a tooth, a plaster model acquired by the impression body, and/or a tooth surface.

Various principles of three-dimensional optical scanners for acquiring the three-dimensional surface data may be used. For example, a three-dimensional scanner using a structured light with stereo vision method illustrated in FIG. 8 may be used. The three-dimensional scanner using the structured light with stereo vision method may be composed of two or more cameras configuring conjugate geometry, and one projector capable of projecting the structured light. FIG. 8 illustrates the three-dimensional scanner of the structured light method composed of two cameras, but a three-dimensional scanner composed of one camera may also be used.

The three-dimensional optical scanner may not acquire shape information inside an object unlike the CT scanner and may acquire only shape information of the surface of the object. At this time, the acquired three-dimensional data of the surface of the object may be generally recorded in a polygon mesh form, and a file format, such as a standard triangle language (STL), polygon file format (PLY), or OBJ form for storing data, may be used. Unlike the three-dimensional volumetric data composed of voxels having an intensity value in all of voxel spaces, the surface data having the polygon mesh form have only location information of the vertices of the surface of the object and connection relationship information of the respective vertices.

Conventionally, a method using geometric information of the three-dimensional data is mainly used to align the location between a plurality of three-dimensional data acquired by the three-dimensional optical scanner in different directions, and among them, an iterative closest point (ICP) method is widely used. The ICP is a method for aligning the location by minimizing a distance deviation between two or more pieces of different three-dimensional data, and widely used in the three-dimensional data processing field.

A general ICP algorithm for aligning the location of the three-dimensional data repetitively performs a process of extracting (sampling) vertices to be used for calculation among vertices on the surface from any one data, extracting a corresponding point corresponding to each vertex from other data, calculating an objective function of using as the energy of distance values for a group of the generated vertices-corresponding points to calculate a movement function between two data having a value of the objective function to the minimum, and moving the location of the data by the movement function until a termination condition is satisfied.

Due to the characteristics of the ICP algorithm, the same points (or points at neighboring locations) are required to match with each other in both data, and the volumetric data and the surface data have different data expression formats, such that it is very difficult to accurately find the corresponding point corresponding to the vertex extracted from the surface data from the volumetric data. Therefore, it is not possible to apply the conventional ICP algorithm upon the location alignment between the volumetric data and the surface data.

The volumetric data have information about all objects within a space, but the surface data have only geometric information for the surface of the object, such that for the location alignment using the ICP algorithm, the information existing in both data is required to be used. Therefore, conventionally, the three-dimensional surface data of the tooth is extracted from the volumetric data acquired by the CT and then the location thereof is aligned with the three-dimensional surface data of the tooth acquired by the three-dimensional scanner.

Figure 10:
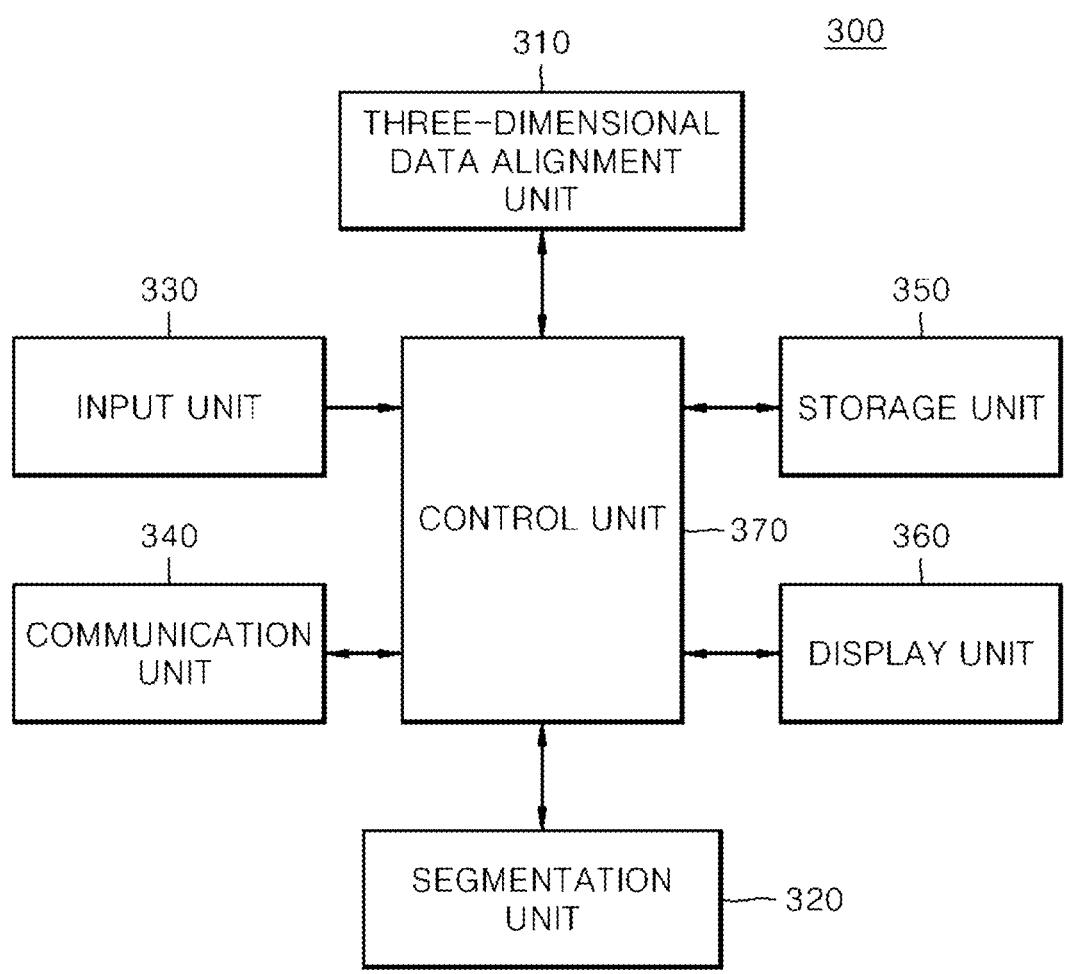
FIG. 10 is a diagram illustrating a configuration of the three-dimensional data alignment apparatus according to the exemplary embodiment of the present disclosure.

FIG. 10 is a diagram illustrating a configuration of the three-dimensional data alignment apparatus according to the exemplary embodiment of the present disclosure. The three-dimensional data alignment apparatus 300 according to the exemplary embodiment of the present disclosure performs the location alignment between the volumetric data and the surface data without a segmentation process of extracting the surface from the volumetric data, and may include a three-dimensional data alignment unit 310, a segmentation unit 320, an input unit 330, a communication unit 340, a storage unit 350, a display unit 360, and a control unit 370.

The three-dimensional data alignment unit 310 may align the location between the volumetric data (first three-dimensional data) and the surface data (second three-dimensional data) expressed in different data forms with respect to the shape of the target to be measured. The volumetric data may be three-dimensional data acquired in a voxel form with respect to the shape of the target to be measured. The surface data may be three-dimensional data acquired in a surface form with respect to the shape of the target to be measured.

The volumetric data (first three-dimensional data) may be data acquired for the target to be measured by the computed tomography (CT) or the magnetic resonance imaging (MRI). The volumetric data (or voxel data) may include intensity information of voxels split at a regular interval. The volumetric data may be expressed in a form of having an intensity value within a voxel structure.

The segmentation unit 320 may extract the surface from the volumetric data, based on location conversion information between the volumetric data and the surface data obtained by the three-dimensional data alignment unit 310. At this time, it should be noted that a first surface is not a surface extracted for the location alignment between the volumetric data and the surface data, but is a surface extracted from the volumetric data after the location alignment, based on the information obtained from the location alignment process between the volumetric data and the surface data. In the exemplary embodiment, the segmentation unit 320 may convert a location of a second surface extracted from the surface data according to the location conversion information, and extract the surface from the volumetric data by extracting voxel values of the volumetric data according to the location conversion information between the surface data and the volumetric data.

The input unit 330 may be provided as a user interface unit for receiving several instructions such as three-dimensional location alignment from a user such as a medical professional. The input unit 330 may include a predetermined input means such as a keyboard, a mouse, a touchpad, or at least one button or switch. The communication unit 340 may receive the three-dimensional volumetric data from the three-dimensional volumetric data generation unit 100, receive the three-dimensional surface data from the three dimensional surface data generation unit 200, and be provided as various wired/wireless communication interfaces.

The storage unit 350 may store the three-dimensional volumetric data, the three-dimensional surface data, the data in which the locations of the three-dimensional volumetric data and the three-dimensional surface data are aligned, the integrated data with which the three-dimensional volumetric data and the three-dimensional surface data match, a program for the location alignment between the three-dimensional volumetric data and the three-dimensional surface data, the surface data extracted from the three-dimensional volumetric data by the segmentation based on the result of the location alignment between the three-dimensional volumetric data and the three-dimensional surface data, and other various information.

The display unit 360 may display information about the three-dimensional volumetric data, the three-dimensional surface data, the data in which the locations of the three-dimensional volumetric data and the three-dimensional surface data are aligned, the integrated data with which the three-dimensional volumetric data and the three-dimensional surface data match, the surface data extracted from the three-dimensional volumetric data by the segmentation based on the result of the location alignment between the three-dimensional volumetric data and the three-dimensional surface data, and the like on a screen of the display unit.

The control unit 370 may apply control instructions to the three-dimensional data alignment unit 310, the segmentation unit 320, the input unit 330, the communication unit 340, the storage unit 350, and the display unit 360 to control operations thereof, and implement a location alignment function between the three-dimensional volumetric data and the three-dimensional surface data by executing a program for the location alignment of the three-dimensional data. The control unit 37 may include at least one processor.

The three-dimensional data alignment unit 310 may extract a plurality of vertices from the second three-dimensional data, and extract intensity values (values of the first voxels) of the voxels (first voxels) located around each vertex from the volumetric data (first three-dimensional data), based on the location of each vertex extracted from the surface data (second three-dimensional data). The three-dimensional data alignment unit 310 may calculate location conversion information minimizing a location error between the volumetric data (first three-dimensional data) and the surface data (second three-dimensional data), based on the first voxel values extracted from the volumetric data (first three-dimensional data). A function, operation, or the like of the three-dimensional data alignment unit 310 will be described later in more detail with reference to FIGS. 12 to 19.

The intensity value of the three-dimensional volumetric data acquired by the CT is rapidly changed on the boundary surface between different objects. For example, the intensity value between the tooth and the gum tissue or between the tooth and the air within the oral cavity is rapidly changed. A point at which the intensity value of the volumetric data is rapidly changed in the normal direction of the vertices extracted from the surface data may be considered as the corresponding point corresponding to the vertex of the surface data. Therefore, the corresponding point may be found from the volumetric data in a method for obtaining a straight line directed to the normal direction of the sampled vertex and then finding the point at which the straight line meets the surface of the surface data.

In the exemplary embodiment, the three-dimensional data alignment unit 310 may be configured to determine sampling locations at a predetermined interval in the normal direction of each vertex extracted from the surface data, and to determine the location conversion information between the surface data and the volumetric data based on the amount of change in the intensity values of the sampling locations. At this time, the three-dimensional data alignment unit 310 may calculate the intensity values with respect to the sampling locations by interpolating the first voxel values of the volumetric data in the three dimensions, based on the location relationship between the first voxels and the sampling locations.

The three-dimensional data alignment unit 310 may determine a location of an inflection point corresponding to each vertex, based on the amount of change in the normal direction of the vertices of the intensity values of the sampling locations. The three-dimensional data alignment unit 310 may determine the movement direction in which a distance error between a plurality of vertices extracted from the surface data and a plurality of inflection points corresponding to the plurality of vertices is minimized.

In another exemplary embodiment, the movement direction may also be calculated after differentiating all of the intensity values around the vertices in the three-dimensional direction, and a high dimensional function may be fitted with the differential value. In the exemplary embodiment, the three-dimensional data alignment unit 310 may also calculate the intensity value at the sampling location based on the change direction information of the first voxel values by differentiating the first voxel values at a location of each vertex to calculate the change directions of the first voxel values.

In the exemplary embodiment, the three-dimensional data alignment unit 310 may be configured to extract the first voxels by excluding the voxel having the voxel value exceeding a reference intensity set with regard to artifact among the voxels located around each vertex from the volumetric data (first three-dimensional data). That is, it is possible to prevent an artifact problem of a metallic material or the like in a method for setting a predetermined intensity value as a threshold value, and not including a voxel having an intensity value equal to or larger than the threshold value in the calculation.

The three-dimensional data alignment apparatus according to the exemplary embodiment of the present disclosure may be applied to the dental CAD/CAM field or the like, and for example, utilized for the treatment or the like using the CT/MRI data in which the patient's head has been measured and the three-dimensional data in which the tooth and the tissue have been measured within the oral cavity of the patient. The three-dimensional surface data may include the surface data acquired for the surface of the tooth. The three-dimensional volumetric data may include the volumetric data acquired for the tooth and the root of the tooth.

The volumetric data in the dental CAD/CAM field may be stored/expressed using a digital imaging and communications in medicine (DICOM) file format. The DICOM format may record 90 or more kinds of information such as the patient's information, a generator, and the like in addition to the intensity. In the exemplary embodiment, the volumetric data may be acquired by an X-ray computed tomography (CT). The volumetric data may be divided into the three axial directions (sagittal, axial, and coronal).

Figure 11:
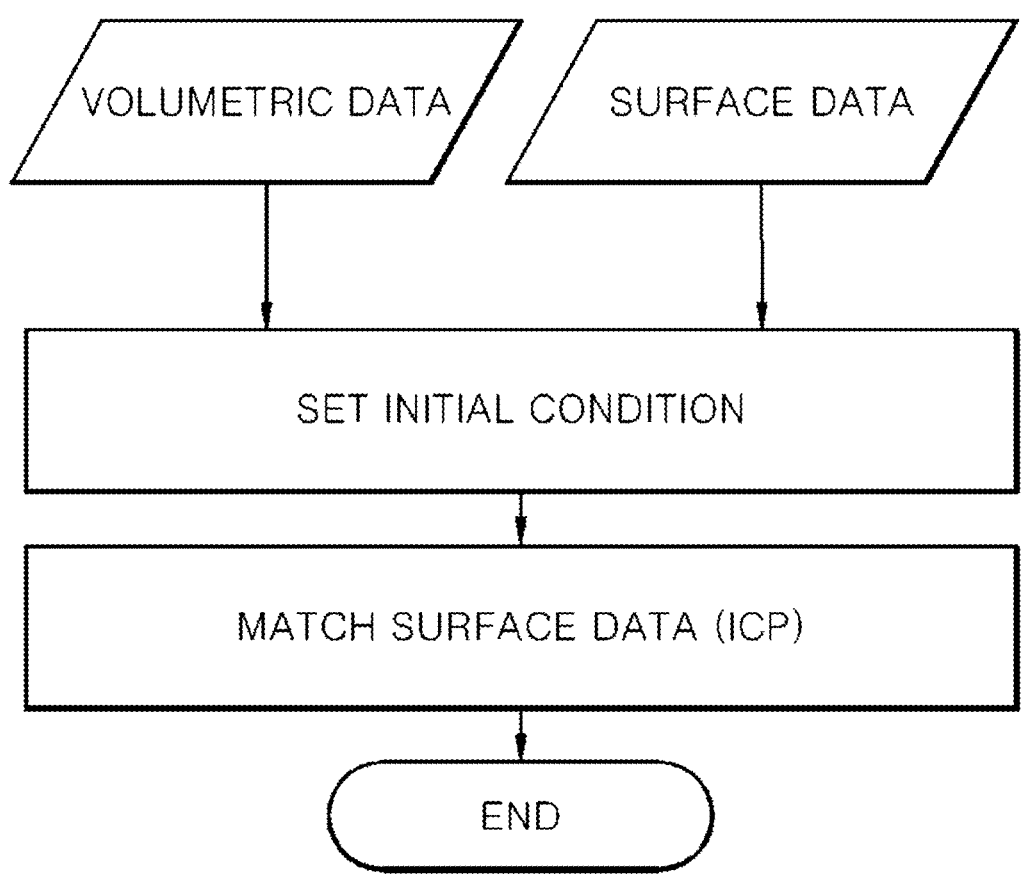
FIG. 11 is a schematic flowchart illustrating a three-dimensional data alignment method according to the exemplary embodiment of the present disclosure.

FIG. 11 is a schematic flowchart illustrating a three-dimensional data alignment method according to the exemplary embodiment of the present disclosure. Referring to FIG. 11, the three-dimensional data alignment method according to the exemplary embodiment of the present disclosure is proposed to solve the conventional problem due to the segmentation for the volumetric data, and directly finds the corresponding point corresponding to the vertex on the surface data from the volumetric data without the segmentation and then performs the location alignment between the volumetric data and the surface data unlike the conventional method.

Figure 12:
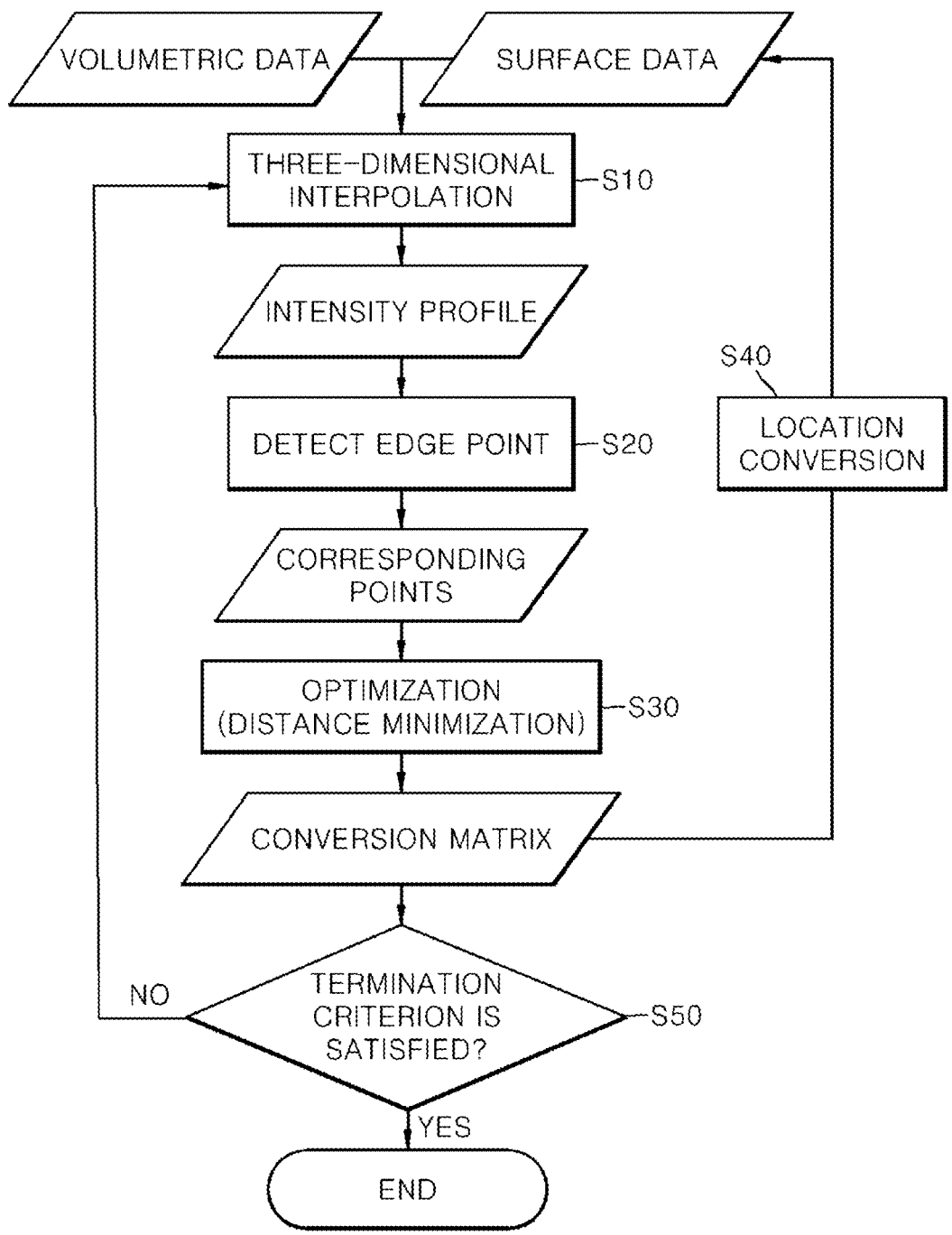
FIG. 12 is a flowchart illustrating the three-dimensional data alignment method according to the exemplary embodiment of the present disclosure.

FIG. 12 is a flowchart illustrating the three-dimensional data alignment method according to the exemplary embodiment of the present disclosure. The three-dimensional data alignment method according to the exemplary embodiment of the present disclosure includes calculating an intensity profile of a region around a vertex by a three-dimensional interpolation based on voxel values of volumetric data, based on one or more vertices extracted from surface data (S10), detecting an edge point (corresponding point) corresponding to the vertex extracted from the surface data based on the intensity profile (S20), calculating a conversion matrix between the surface data and the volumetric data by optimizing a distance between the vertex of the surface data and the edge point to be minimized (S30), and moving and converting locations of three-dimensional surface data and/or three-dimensional volumetric data according to a movement conversion matrix calculated by an optimization process (S40). The S10 to S40 of the three-dimensional data alignment method may be repeated until a distance error between corresponding points of the surface data and the volumetric data satisfies a termination criterion.

Figure 13:
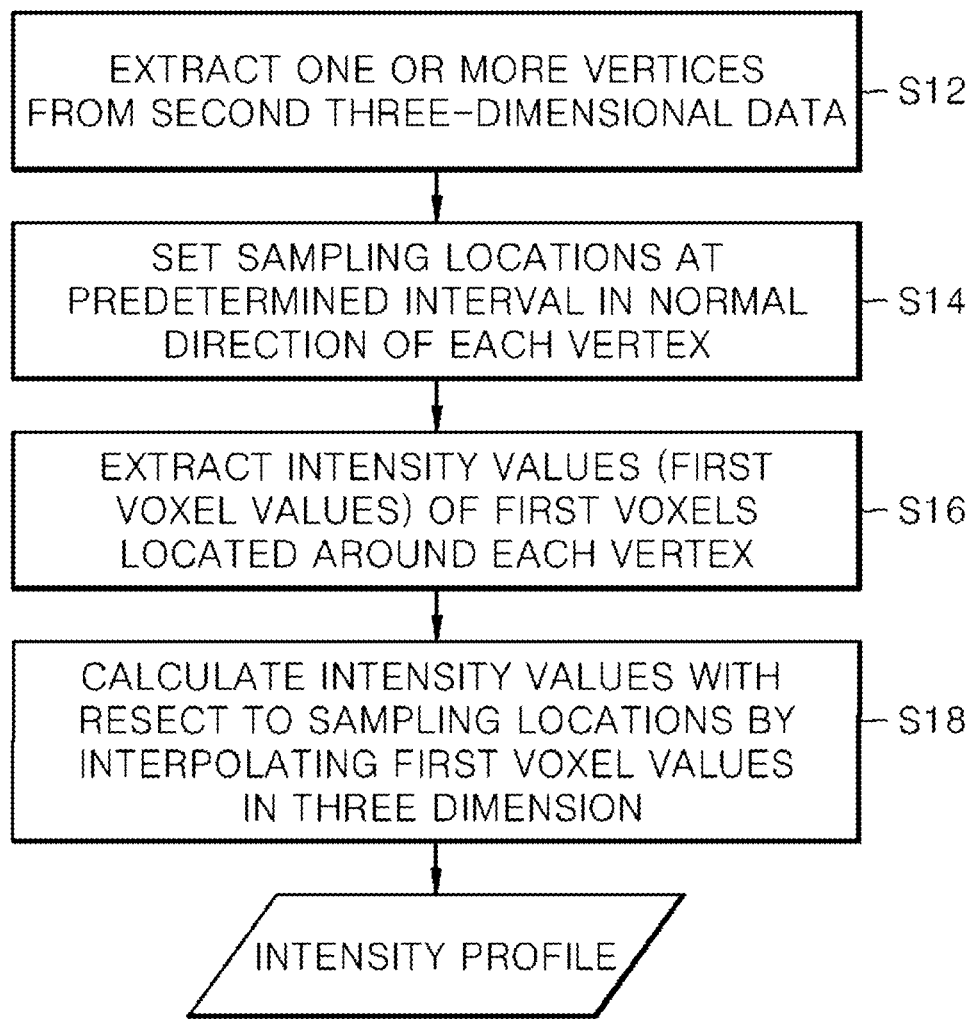
FIG. 13 is a flowchart of a step S10 illustrated in FIG. 12.

FIG. 13 is a flowchart of the step S10 illustrated in FIG. 12. For the location alignment between the volumetric data (first three-dimensional data) and the surface data (second three-dimensional data), one or more vertices are first extracted from the surface data (second three-dimensional data) (S12). In the present specification, the vertex means a point on the surface of the surface data. That is, all of the points on the surface data may be vertices, and the vertex is not construed to be limited as meaning the point satisfying a specific condition on the surface data.

Figure 14:
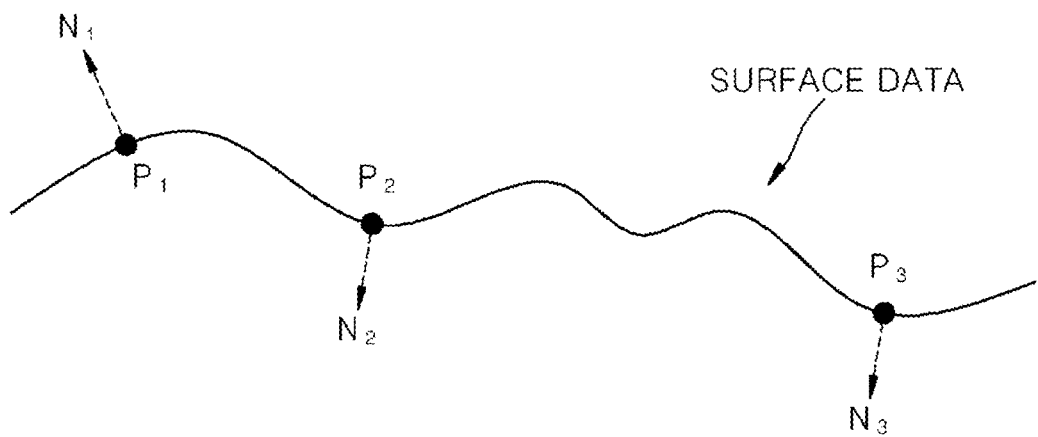
FIG. 14 is an exemplary diagram illustrating a result of the extraction of vertices from the surface data, and calculation of a normal vector of the vertex according to the exemplary embodiment of the present disclosure.

FIG. 14 is an exemplary diagram illustrating the result of the extraction of vertices $P_1$, $P_2$, $P_3$ from the surface data, and the calculation of normal vectors $N_1$, $N_2$, $N_3$ of the vertices according to the exemplary embodiment of the present disclosure. A method for extracting a vertex from the surface data is not limited to a special method. Since the method for extracting the vertex is well known in the data processing field, a detailed description thereof will be omitted in the present specification. For the location alignment between the three-dimensional surface data and the three-dimensional volumetric data, it is preferable to extract three or more vertices from the surface data.

Figure 15:
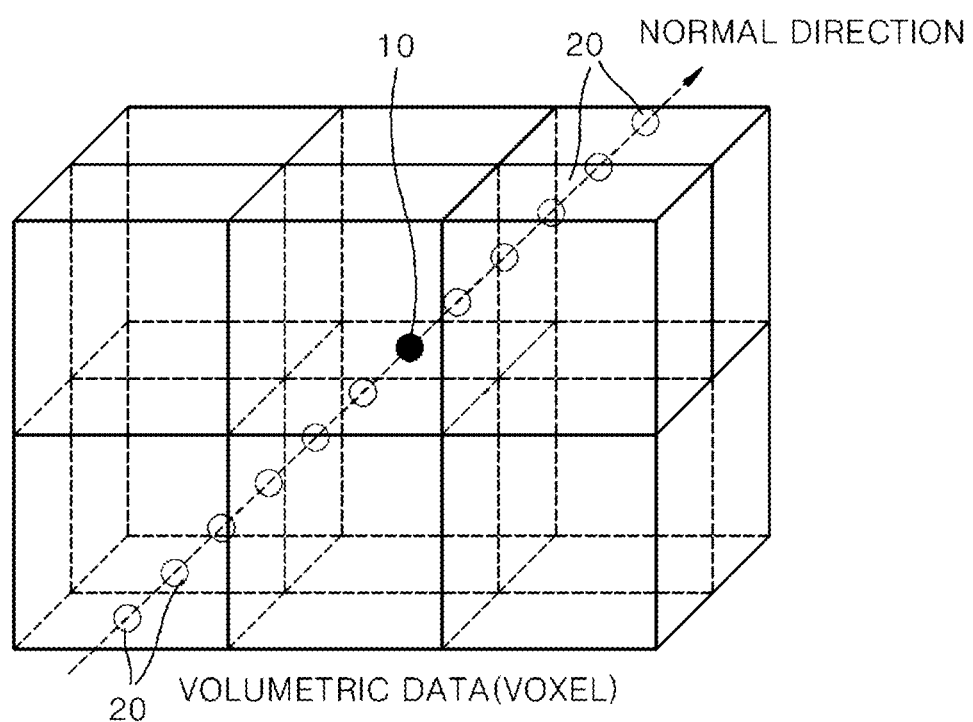
FIG. 15 is a conceptual diagram for explaining a step S14 illustrated in FIG. 13.
Figure 16:
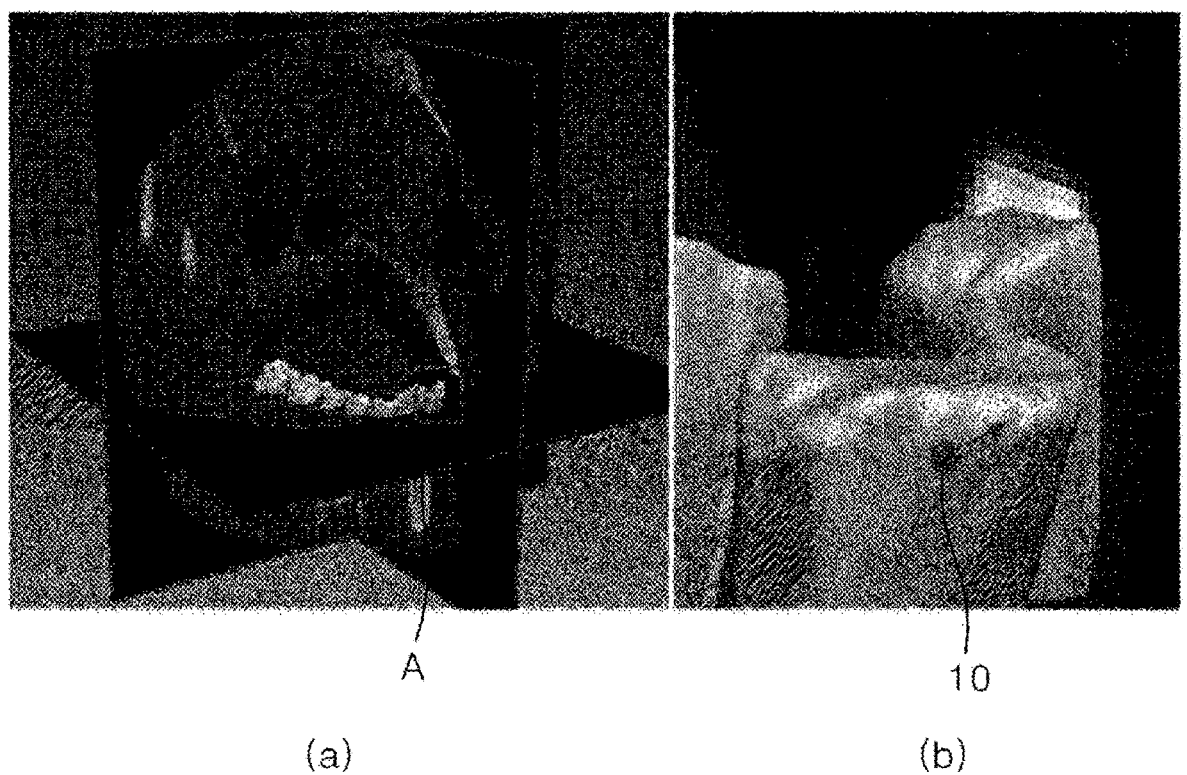
FIG. 16 is an exemplary diagram illustrating a location of the vertex extracted from the surface data in the volumetric data acquired by the three-dimensional volumetric data generation unit.
Figure 17:
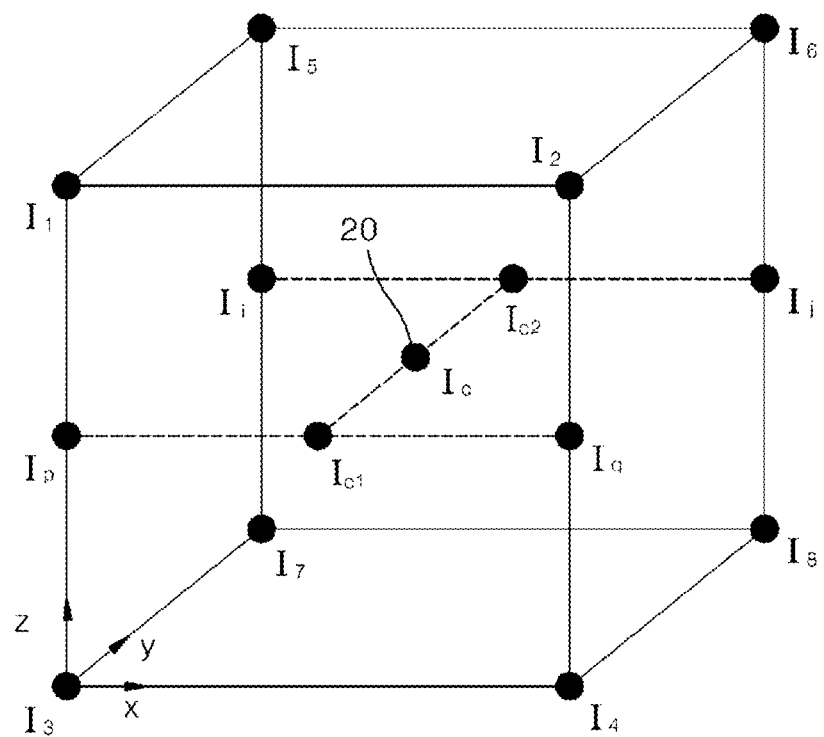
FIG. 17 is an enlarged diagram of a portion 'A' illustrated in FIG. 16.

FIG. 15 is a conceptual diagram for explaining a step S14 illustrated in FIG. 13. FIG. 16 is an exemplary diagram illustrating a location of a vertex extracted from the surface data in the volumetric data acquired by the three-dimensional volumetric data generation unit. FIG. 17 is an enlarged diagram of a portion 'A' illustrated in FIG. 16. Referring to FIGS. 13, and 15 to 17, when a vertex 10 is extracted from the surface data, sampling locations 20 may be determined at a predetermined interval in the normal direction of each vertex 10 from the volumetric data, based on the location of each vertex 10 extracted from the surface data (S14).

When the sampling locations 20 are determined, intensity values of the first voxels (the first voxel values) of the volumetric data corresponding to the sampling locations 20 are extracted (S16), and an intensity profile in the normal direction of each vertex 10 may be generated by interpolating the first voxel values in the three dimensions to calculate the intensity value for each of the sampling locations 20, based on the location relationship between the first voxels and the sampling locations (S18).

FIG. 17 is a conceptual diagram for explaining a process of calculating the intensity value at the sampling location by interpolating the voxel values in the three dimensions according to the exemplary embodiment of the present disclosure. In the exemplary embodiment, an intensity value at a sampling location $I_c$ on the normal line of the vertex 10 sampled from the volumetric data may be calculated by interpolating intensity values $I_1$ to $I_8$ of the voxels around the sampling location $I_c$. A linear interpolation method which is the most basic method among various interpolation methods as in the following equation may be used, but the present disclosure is not limited thereto.

$$I_p=(1-t)\cdot I_1+t\cdot I_3\ I_i=(1-t)\cdot I_5+t\cdot I_7$$

$$I_q=(1-t)\cdot I_2+t\cdot I_4\ I_j=(1-t)\cdot I_6+t\cdot I_8$$

$$I_{c1}=(1-s)\cdot I_p+s\cdot I_q\ I_{c2}=(1-s)\cdot I_i+s\cdot I_j$$

$$I_c=(1-r)\cdot I_{c1}+r\cdot I_{c2}$$

In the Equation, $I_1$ to $I_8$ refer to eight voxel values around the sampling location $I_c$, and 's', 'r', 't' refer to coordinate values of the voxel levels (x, y, z) of the sampling location $I_c$ based on the location of any one voxel $I_1$ among the neighboring voxels, and may have a value of 0 to 1, respectively.

Figure 18:
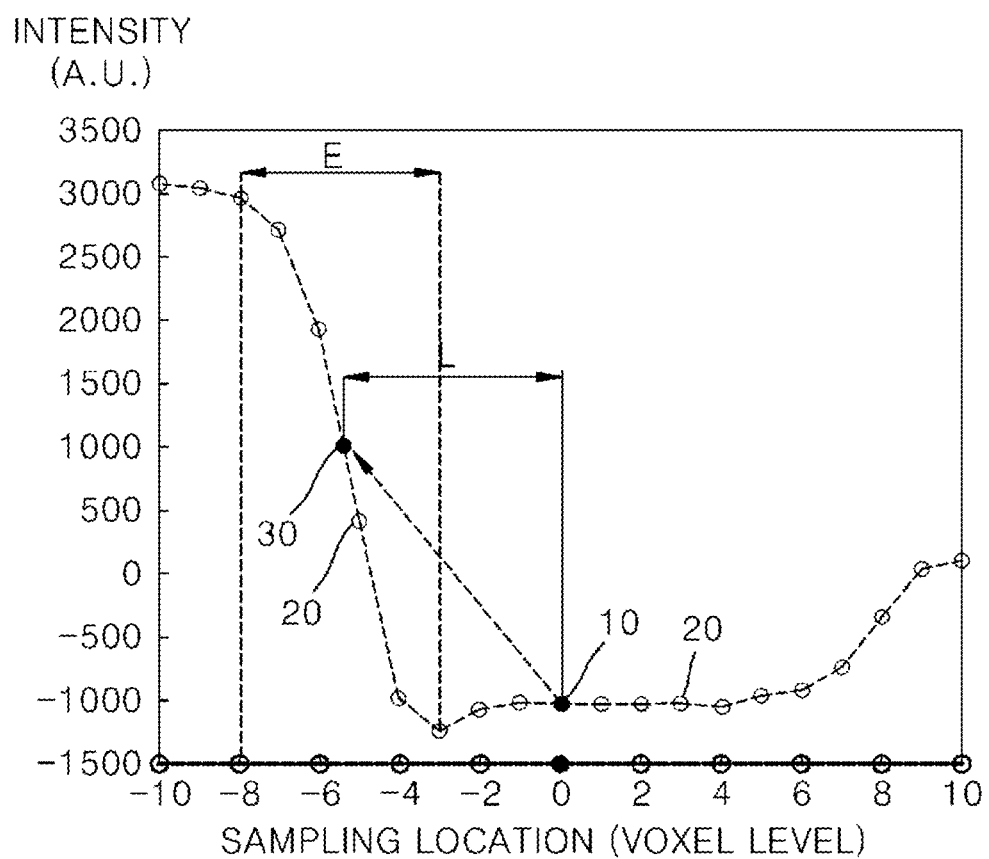
FIG. 18 is a conceptual diagram for explaining a process of detecting an edge point corresponding to the vertex of the surface data based on an intensity profile of sampling locations according to the exemplary embodiment of the present disclosure.

FIG. 18 is a conceptual diagram for explaining a process of detecting an edge point corresponding to the vertex of the surface data based on the intensity profile of the sampling locations according to the exemplary embodiment of the present disclosure. In FIG. 18, a horizontal axis represents a sampling location (voxel level) based on the location of the vertex 10, and a vertical axis represents an intensity value measured at each sampling location 20 by interpolating the voxel values of the volumetric data in the three dimensions. In FIG. 18, a section in which the intensity values are rapidly changed corresponds to an edge region E in which the surface of the target to be measured exists in the volumetric data. In FIG. 18, a location in which the sampling location in the horizontal axis is '0' is a location of the vertex 10 on the surface data.

When the initial locations between the volumetric data and the surface data are sufficiently close to each other, the contour (boundary surface) on the volumetric data exist at the sampling location 20 around the vertex 10. At this time, when the amount of change in the intensity values at the sampling locations 20 around the vertex 10 is schematically illustrated, a graph in which the intensity value is rapidly changed may be obtained. At this time, an inflection point at the edge region E in which the intensity value is rapidly changed may be determined as the corresponding point (edge point) corresponding to the vertex 10 extracted from the surface data. In FIG. 18, a reference numeral 'L' refers to a distance error between the vertex 10 and the corresponding point (edge point) 30. The edge point 30 corresponding to the vertex 10 may also be determined by calculating the inflection point in the edge region E of the intensity profile, and determined as any one location of the sampling locations within two or more edge regions E having the largest amount of change in the intensity values, or also be determined by a statistical processing such as calculation/geometrical average for the sampling locations within the edge region E.

The intensity profile may be utilized to determine the location conversion information between the volumetric data and the surface data based on the amount of change in the intensity values between the sampling locations 20. To find the corresponding point of each vertex 10 extracted from the three-dimensional surface data, when the straight line is generated in the normal vector direction of the vertex 10 and the voxel values of the three-dimensional volumetric data meeting the straight line are used, the intensity profile may be generated at the sampling locations on the straight line parallel to the normal of the vertex. When the intensity value is sampled at a predetermined interval in the normal vector direction for the surface of the vertex 10 around the vertex 10 in the three-dimensional volumetric data, the amount of change in the intensity value in the normal vector direction in the volumetric data may be confirmed.

The sampling locations 20 may also be calculated at a regular interval, and also be calculated at different intervals for each section. In the exemplary embodiment illustrated in FIG. 18, the sampling locations 20 may be sampled at a unit voxel interval, but the sampling locations 20 may also be sampled at a sampling interval larger or smaller than the unit voxel. Further, the sampling locations 20 may also be sampled in both directions parallel to the normal direction with respect to the vertex 10, respectively, and also be sampled only in one direction with respect to the vertex 10.

In another exemplary embodiment of the present disclosure, the sampling locations 20 are not sampled in the normal direction with respect to the surface of the vertex 10, and may also be sampled in one or more directions different from the normal direction. For example, after the intensity profile is generated for each direction by generating the sampling locations 20 in various directions, the corresponding point (edge point) may be determined from the intensity profile in which the change in the intensity value is the largest and thus may also be utilized to calculate the location conversion information.

Figure 19:
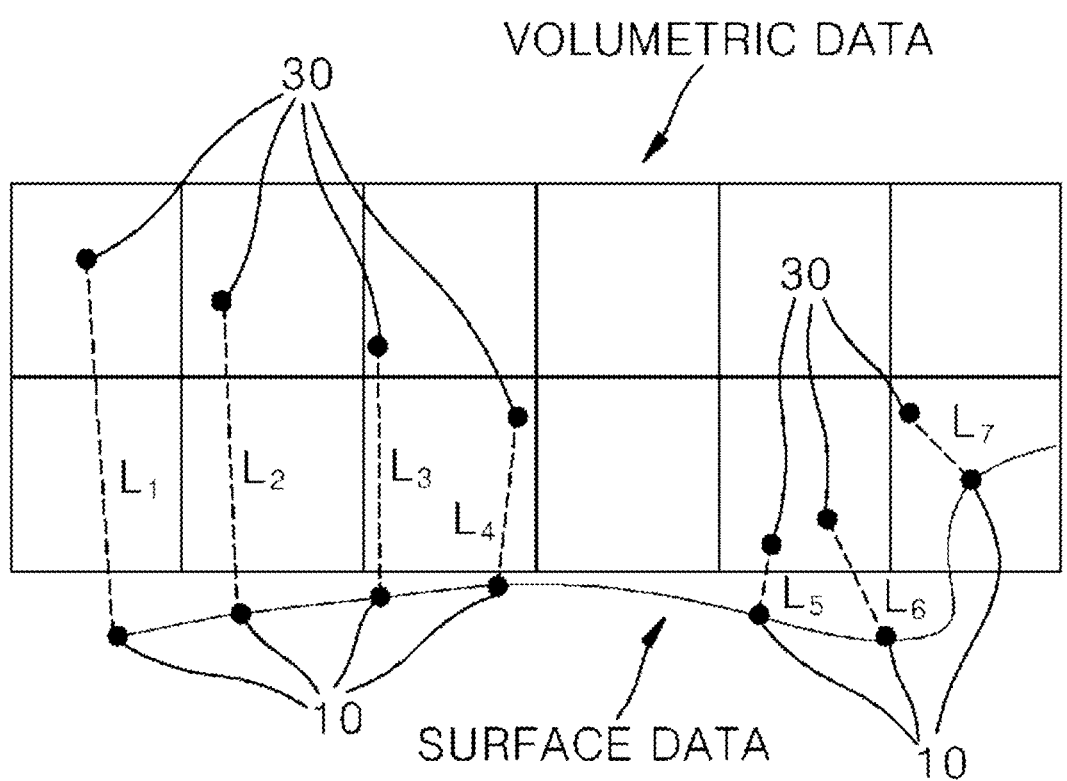
FIG. 19 is a conceptual diagram for explaining a process of calculating a location conversion relationship between the surface data and the volumetric data based on a distance between corresponding points according to the exemplary embodiment of the present disclosure.

FIG. 19 is a conceptual diagram for explaining a process of calculating the location conversion relationship between the surface data and the volumetric data based on a distance between the corresponding points according to the exemplary embodiment of the present disclosure. Referring to FIGS. 18 and 19, by confirming the amount of change in the intensity in the normal direction of the vertex 10 from the intensity values (intensity profile) of the sampling locations 20, the location of the inflection point (edge point) 30 corresponding to each vertex 10 may be determined, and the movement direction (location conversion matrix) capable of minimizing distance errors $L_1, L_2, \ldots, L_7$) between a plurality of vertices 10 and a plurality of inflection points (edge points) 30 corresponding to the plurality of vertices 10 may be determined.

Another method for calculating the intensity values at the sampling locations may calculate the change direction of the intensity value by differentiating all of the intensity values around the vertex in the three dimensions, and then also calculate the intensity values at the sampling locations by fitting the high dimensional function using the differential value. At this time, the method may calculate the change directions of the voxel values by differentiating the neighboring voxel values of the volumetric data at the location of each vertex, generate the intensity profile by reflecting the differential value corresponding to the sampling location to calculate the intensity value at the sampling location, and calculate the movement conversion matrix between each vertex and the corresponding point such that the distance error between the volumetric data (first three-dimensional data) and the surface data (second three-dimensional data) is minimized based on the intensity profile.

Figure 20:
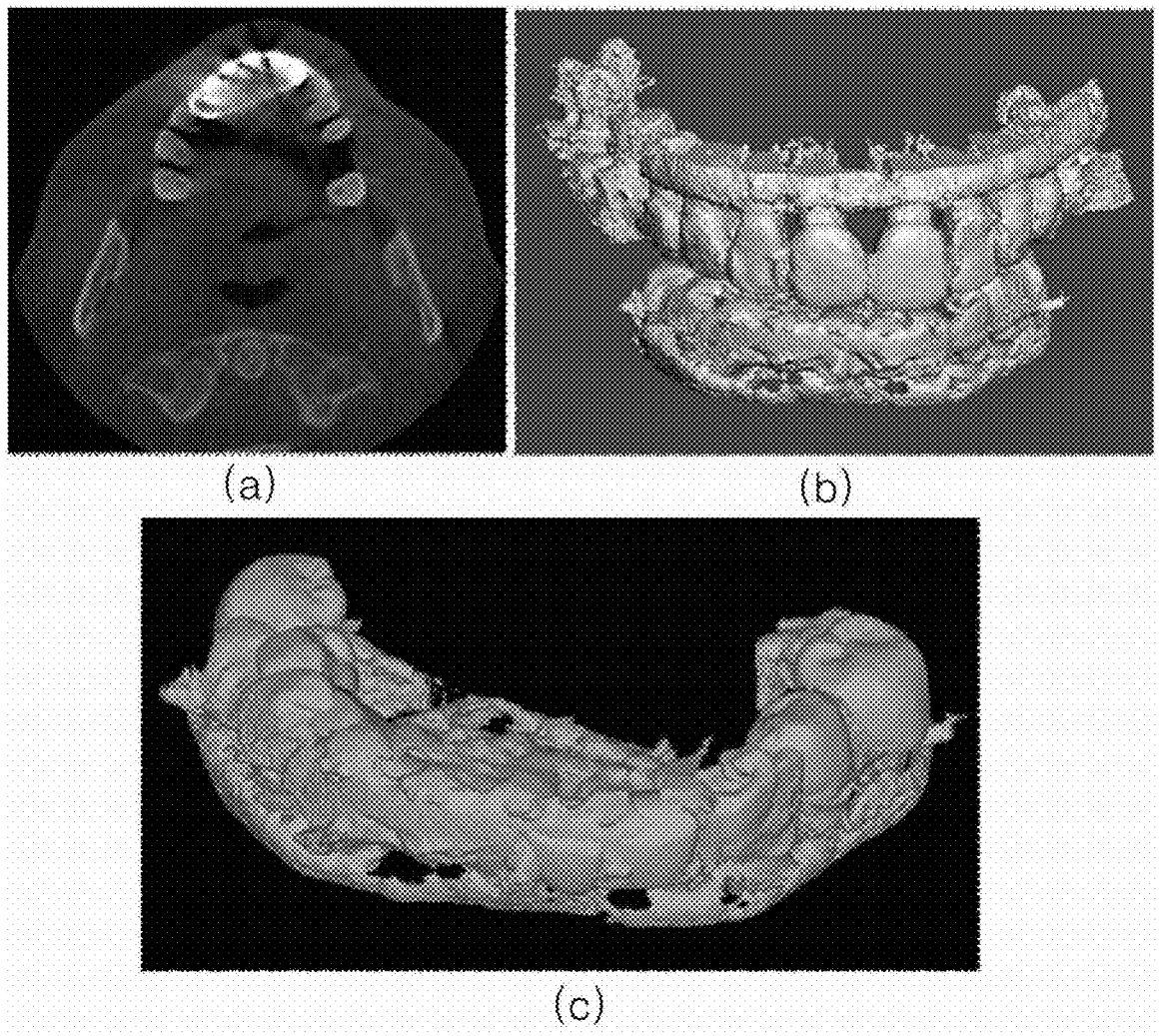
FIG. 20 is an exemplary diagram illustrating a problem due to artifact of a metallic material.

FIG. 20 is an exemplary diagram illustrating a problem due to artifact of a metallic material. If a prosthesis made of a metallic material such as gold or amalgam exists in the patient's tooth, the CT data of the patient has the intensity value in a saturation state in a portion in which the metallic prosthesis exists and thus neighboring volumetric data may be contaminated, such that the result of the location alignment between the volumetric data and the surface data may also be distorted. To solve such a problem, in the three-dimensional data alignment method according to the exemplary embodiment of the present disclosure, first voxels may be extracted by excluding a voxel having a voxel value exceeding a reference intensity set with regard to the artifact of the metallic material among the voxels located around each vertex from the volumetric data (first three-dimensional data) to be utilized to calculate the intensity profile.

In the exemplary embodiment, based on the location conversion information between the surface data (second three-dimensional data) and the volumetric data (first three-dimensional data), a first surface may be extracted from the volumetric data (first three-dimensional data). At this time, the first surface may be extracted by converting a location of a second surface extracted from the surface data (second three-dimensional data) according to the location conversion information, and extracting the intensity values of the volumetric data (first three-dimensional data) based on the second surface whose location is converted.

A surface may be extracted from the three-dimensional volumetric data by performing an automatic segmentation with respect to the three-dimensional volumetric data with reference to the location on the three-dimensional volumetric data of the surface extracted from the surface data. In the exemplary embodiment, after performing the location alignment between the volumetric data and the scan surface data to determine a final location, new surface data may be generated from the volumetric data with reference to the result of the location alignment. At this time, as a method for generating the surface data from the volumetric data, a method for finding all of the edge points (inflection points) in the finally location aligned state and then connecting the respective edge points to generate the surface from the volumetric data or the like may be used.

The exemplary embodiment of the present disclosure may automatically calculate an optimal segmentation location according to the degree of change in the intensity of the voxel data, thereby removing a human error which may be generated depending on the user's skill level. Further, it is possible to omit the segmentation process of extracting the surface from the voxel data, thereby shortening a working time required for the three-dimensional data alignment. Further, the low-skilled person may easily align the surface data and the volumetric data as well, and more accurately acquire three-dimensional data. Further, when the surface is extracted from the volumetric data, the surface may be extracted by automatically determining the intensity utilizing the alignment result.

Figure 21:
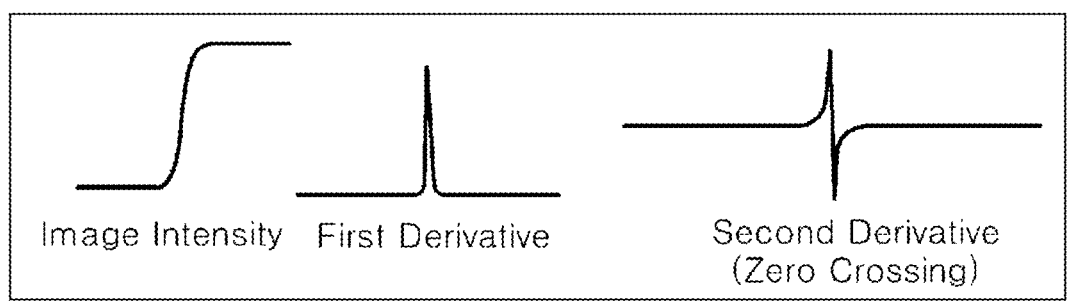
FIG. 21 is an exemplary diagram for explaining the three-dimensional data alignment method according to the exemplary embodiment of the present disclosure.

As described above, for the location alignment between the voxel data and the surface data, an exemplary embodiment which performs the alignment between the surface data and the voxel data by directly finding the corresponding point of the point sampled from the surface data from the voxel data without the segmentation process of extracting the surface from the voxel data has been described. The voxel data indicates intensity or transmittance for an inner object in a predetermined space, and are determined by the physical property of the inner object, such that a change in the intensity will be large on the boundary surface thereof. Therefore, by sampling and the voxel value (scalar) in one dimension in the normal vector direction of the vertex on the surface (boundary surface) from the voxel data and then differentiating the sampled voxel value, a location corresponding to a portion having the largest amount of change, that is, an extreme value of the first differential for the voxel values in FIG. 21, that is, a zero-crossing when the voxel values are differentiated twice may be found and estimated as a location on the surface.

At this time, the voxel data may be considered as a three-dimensional scalar field, and it is also possible to find the corresponding point on the voxel data corresponding to the surface data in another method, in addition to the method for finding the corresponding point based on the amount of change in the voxel values according to the distance in the normal vector direction of the surface of the boundary surface of the vertex in finding a portion having the large amount of change in the three-dimensional scalar field. For example, it is possible to find the corresponding point on the voxel data by differentiating (∇, gradient) the three-dimensional scalar field of the voxel data with each directional component. More specifically, the corresponding point may also be determined by differentiating all of the voxel data in the three dimensions, then setting a specific space (e.g., sphere having a radius R around the vertex, a square region in which the length of each side is R, or the like) around each vertex extracted from the surface, finding a point corresponding to the extreme value of the first differential within the set space, and then comparing a value of the point with neighboring other values to confirm how much it is different from the other values.

Figure 22:
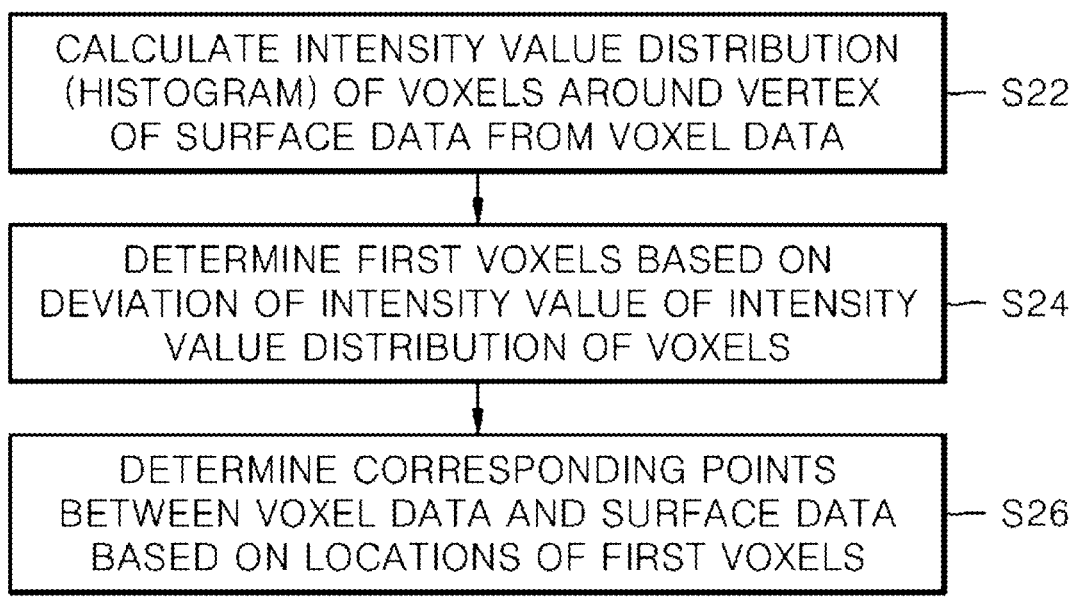
FIG. 22 is a flowchart illustrating a three-dimensional data alignment method according to another exemplary embodiment of the present disclosure.

FIG. 22 is a flowchart illustrating the three-dimensional data alignment method according to a still another exemplary embodiment of the present disclosure. FIG. is an exemplary diagram for explaining the three-dimensional data alignment method according to the exemplary embodiment illustrated in FIG. 22. Referring to FIGS. 22 and 23, it is also possible to find the corresponding point corresponding to the vertex of the surface data from the voxel data based on the intensity value distribution of the voxel data without differentiating the voxel data. For example, it is possible to find the corresponding point from the voxel data based on a histogram of the intensities of the voxel data which exist within a specific space around each vertex extracted from the surface data.

More specifically, the intensity value distribution (e.g., histogram) of the voxels may be first calculated at various locations and/or in various directions around the vertex of the surface data from the voxel data (S22). In the graph of the voxel intensity illustrated in FIG. 23, a horizontal axis represents a voxel location, and a vertical axis represents a voxel intensity. In FIG. 23, a 'set1' refers to a section in which the corresponding point corresponding to the surface exists, and represents a tendency in which the voxel values are divided into and distributed to two intensity sections (intensity sections '1', '11') by the surface (in a case where a derivation of the intensity values is large) based on the surfaces of the voxel values. Unlike this, a 'set2' refers to a section having no boundary surface, that is, a section corresponding to the inside of a uniform material, and represents a tendency in which the voxel values are maintained at a regular intensity (in a case where the deviation of the intensity values is small). A 'set3' represents a voxel intensity distribution in a section in which noise is large, and corresponds to a case where the deviation of the intensity value is small as in the 'set2'. When the histogram of each voxel data is obtained, the histogram is shown in a form in which in the 'set1', a high frequency appears in each of two different intensity sections, in the 'set2', a high frequency appears only in one intensity section, and in the 'set3', a high frequency does not appear in a specific section. Therefore, the first voxels to be utilized to determine the location of the corresponding point among the voxels may be determined based on the deviation of the intensity values of the intensity value distribution of the voxel data (S24).

In the example illustrated in FIG. 23, the corresponding points between the surface data and the voxel data may be determined using the voxels corresponding to the data of the 'set1' in which the high frequency appears in each of two intensity sections as the first voxels. At this time, the corresponding points between the voxel data and the surface data may be determined based on the locations of the first voxels (S26). For example, the corresponding point may be determined based on the statistic processing such as calculating an average location of the voxel points having the intensity significantly different from the intensity of the location of the vertex extracted from the surface of two main components from the intensity histogram of the voxel data.

As described above, although the exemplary embodiments of the present disclosure have been mainly described based on the case of aligning the location of the three-dimensional data for dental treatment as an example, the exemplary embodiments of the present disclosure may also be applied to the medical field in addition to the dental treatment, or the application in addition to the medical field. Even if it has been described that all of components configuring the exemplary embodiments of the present disclosure are integrated as one to be operated, the present disclosure is not necessarily limited to the aforementioned exemplary embodiments.

One or more of all of components may also be selectively coupled to be operated according to the exemplary embodiment within the scope of the object of the present disclosure. The aforementioned description is merely illustrative of the technical spirit of the present disclosure, and those skilled in the art to which the present disclosure pertains will variously modify and change the present disclosure without departing from the essential characteristics of the present disclosure.

What is claimed is:

1. A three-dimensional data alignment apparatus comprising:
   a three-dimensional data alignment unit for aligning a location between first three-dimensional data and second three-dimensional data expressed in different data forms with regard to a target to be measured,
   wherein the first three-dimensional data aligning with the second three-dimensional data are three-dimensional data acquired in a voxel form with regard to the target to be measured and including an edge region in which the surface of the target to be measured exists,
   wherein the second three-dimensional data are three-dimensional data acquired in a surface form with regard to the target to be measured, wherein the second three-dimensional data is different from surfaces extracted by segmentation of the first three-dimensional data,
   wherein the three-dimensional data alignment unit is configured to:
      extract one or more vertices from the second three-dimensional data,
      determine sampling locations at a predetermined interval in a normal direction perpendicular to a surface of each vertex extracted from the second three-dimensional data which is volume data before segmentation,
      extract the first voxel values of first voxels located around each vertex from the first three-dimensional data, based on a location of each vertex extracted from the second three-dimensional data, calculate intensity values at the sampling locations within the edge region based on the first voxel values, and determine corresponding points between the first three-dimensional data and the second three-dimensional data based on the first voxel values extracted from the first three-dimensional data, and calculate location conversion information minimizing a location error between the first three-dimensional data and the second three-dimensional data based on the corresponding points.

2. The three-dimensional data alignment apparatus of claim 1, wherein the three-dimensional data alignment unit is configured to:

determine the location conversion information based on the amount of change in the intensity values between the sampling locations.

3. The three-dimensional data alignment apparatus of claim 2, wherein the three-dimensional data alignment unit is configured to calculate the intensity values with respect to the sampling locations by interpolating the first voxel values in the three dimensions, based on the location relationship between the first voxels and the sampling locations, extract an inflection point from the first three-dimensional data based on the amount of change in the normal direction of the intensity values, and determine the inflection point and each vertex as corresponding points, and calculate a distance error between each vertex and the inflection point, and determine the movement direction in which the distance error is minimized for location alignment between the first three-dimensional data and the second three-dimensional data.

4. The three-dimensional data alignment apparatus of claim 2, wherein the three-dimensional data alignment unit is configured to calculate change directions of the first voxel values by differentiating the first voxel values at the location of each vertex, determine sampling locations around each vertex extracted from the second three-dimensional data, calculate the intensity values at the sampling locations based on the change directions of the first voxel values, and determine the movement direction in which the distance error between the first three-dimensional data and the second three-dimensional data is minimized based on the amount of change in the intensity values.

5. The three-dimensional data alignment apparatus of claim 1, wherein the three-dimensional data alignment unit is configured to extract the first voxels by excluding voxels having a voxel value exceeding a reference intensity set with regard to artifact of a metallic material among the voxels located around each vertex from the first three-dimensional data.

6. The three-dimensional data alignment apparatus of claim 1, further comprising: a segmentation unit for extracting a first surface from the first three-dimensional data, based on the location conversion information between the first three-dimensional data and the second three-dimensional data.

7. The three-dimensional data alignment apparatus of claim 6, wherein the segmentation unit is configured to convert a location of a second surface extracted from the second three-dimensional data according to the location conversion information, and extract the first surface by extracting the intensity values of the first three-dimensional data corresponding to the second surface converted according to the location conversion information.

8. The three-dimensional data alignment apparatus of claim 1, wherein the three-dimensional data alignment unit is configured to calculate an intensity value distribution of voxels around the vertex from the first three-dimensional data, determine the first voxels based on a deviation of the intensity values from the intensity value distribution of the voxels around the vertex, and determine the corresponding points based on the locations of the first voxels.

9. The three-dimensional data alignment apparatus of claim 1, wherein the first three-dimensional data comprises: volumetric data acquired for the target to be measured by a computed tomography (CT) or a magnetic resonance imaging (MRI), and the volumetric data comprises: intensity information of the voxels split at a regular interval, and wherein the second three-dimensional data comprises: surface data acquired for the target to be measured by a three-dimensional optical scanner, and the surface data comprises: location information of vertices and normal vector information of the vertices.

10. The three-dimensional data alignment apparatus of claim 9, wherein the first three-dimensional data comprises: volumetric data acquired for a tooth and the root of the tooth, and wherein the second three-dimensional data comprises: surface data acquired for at least one surface among the tooth, an impression body of the tooth, and a plaster model acquired by the impression body.

11. A three-dimensional data alignment method, the method comprising:

aligning, by a three-dimensional data alignment unit, a location between first three-dimensional data and second three-dimensional data expressed in different data form with regard to a target to be measured, wherein the first three-dimensional data aligning with the second three-dimensional data are three-dimensional data acquired in a voxel form with regard to the target to be measured and including an edge region in which the surface of the target to be measured exists, and the second three-dimensional data are three-dimensional data acquired in a surface form with regard to the target to be measured, wherein the second three-dimensional data is different from surfaces extracted by segmentation of the first three-dimensional data, wherein the aligning of the location comprises:

extracting one or more vertices from the second three-dimensional data;

determining sampling locations at a predetermined interval in a normal direction perpendicular to a surface of each vertex extracted from the second three-dimensional data which is volume data before segmentation;

extracting the first voxel values of first voxels located around each vertex from the first three-dimensional data, based on a location of each vertex extracted from the second three-dimensional data;

calculating intensity values at the sampling locations within the edge region based on the first voxel values, and determining corresponding points between the first three-dimensional data and the second three-dimensional data based on the first voxel values extracted from the first three-dimensional data and intensity values at the sampling locations within the edge region calculated based on the first voxel values; and calculating location conversion information minimizing a location error between the first three-dimensional data and the second three-dimensional data based on the corresponding points.

12. The three-dimensional data alignment method of claim 11, wherein the aligning of the location comprises:

determining the corresponding points between the first three-dimensional data and the second three-dimensional data based on at least one of the amount of change in and the direction of change in the first voxel values between the sampling locations; and determining the location conversion information based on the corresponding points.

13. The three-dimensional data alignment method of claim 12, wherein the aligning of the location comprises:

calculating the intensity values with respect to the sampling locations by interpolating the first voxel values in the three dimensions, based on the location relationship between the first voxels and the sampling locations;

extracting an inflection point from the first three-dimensional data based on the amount of change in the normal direction of the intensity values, and determining the inflection point and each vertex as the corresponding points; and calculating a distance error between each vertex and the inflection point, and determining the movement direction in which the distance error is minimized for the location alignment between the first three-dimensional data and the second three-dimensional data.

14. The three-dimensional data alignment method of claim 12, wherein the aligning of the location comprises:

calculating change directions of the first voxel values by differentiating the first voxel values at a location of each vertex;

determining sampling locations around each vertex extracted from the second three-dimensional data;

calculating the intensity values at the sampling locations based on the change directions of the first voxel values; and determining the movement direction in which the distance error between the first three-dimensional data and the second three-dimensional data is minimized based on the amount of change in the intensity values.

15. The three-dimensional data alignment method of claim 11, wherein the aligning of the location extracts the first voxels by excluding voxels having a voxel value exceeding a reference intensity set with regard to artifact of a metallic material among the voxels located around each vertex from the first three-dimensional data.

16. The three-dimensional data alignment method of claim 11, further comprising: extracting, by a segmentation unit, a first surface from the first three-dimensional data, based on the location conversion information between the first three-dimensional data and the second three-dimensional data.

17. The three-dimensional data alignment method of claim 16, wherein the extracting of the first surface comprises:

converting a location of a second surface extracted from the second three-dimensional data according to the location conversion information, and extracting the first surface by extracting the intensity values of the first three-dimensional data corresponding to the second surface converted according to the location conversion information.

18. The three-dimensional data alignment method of claim 11, wherein the first three-dimensional data comprises: volumetric data acquired for the target to be measured by a computed tomography (CT) or a magnetic resonance imaging (MRI), and the volumetric data comprises: intensity information of the voxels split at a regular interval, wherein the second three-dimensional data comprises: surface data acquired for the target to be measured by a three-dimensional optical scanner, and the surface data comprises: location information of vertices and normal vector information of the vertices, wherein the first three-dimensional data comprises: volumetric data acquired for a tooth and the root of the tooth, and wherein the second three-dimensional data comprises: surface data acquired for at least one surface among the tooth, an impression body of the tooth, and a plaster model acquired by the impression body.

19. The three-dimensional data alignment method of claim 11, wherein the aligning of the location comprises:

calculating an intensity value distribution of voxels around the vertex from the first three-dimensional data;

determining the first voxels based on a deviation of the intensity values in the intensity value distribution of the voxels around the vertex; and determining the corresponding points based on the locations of the first voxels.

20. The three-dimensional data alignment apparatus of claim 1, wherein the sampling locations at the predetermined interval are located along a single line in the normal direction perpendicular to the surface of each vertex extracted from the second three-dimensional data.

* * * * *